United States Patent
Dai et al.

(10) Patent No.: US 10,157,232 B2
(45) Date of Patent: Dec. 18, 2018

(54) PERSONALIZING DEEP SEARCH RESULTS USING SUBSCRIPTION DATA

(71) Applicant: Samsung Electronics Co., Ltd., Suwon-si, Gyeonggi-do (KR)

(72) Inventors: Xueying Dai, Santa Clara, CA (US); Eric J. Glover, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 458 days.

(21) Appl. No.: 14/810,160

(22) Filed: Jul. 27, 2015

(65) Prior Publication Data

US 2016/0188731 A1 Jun. 30, 2016

Related U.S. Application Data

(60) Provisional application No. 62/186,968, filed on Jun. 30, 2015, provisional application No. 62/099,088, filed on Dec. 31, 2014.

(51) Int. Cl.
*G06F 17/30* (2006.01)
*H04L 29/08* (2006.01)

(52) U.S. Cl.
CPC ........ *G06F 17/30867* (2013.01); *H04L 67/10* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 7,984,056 B1 | 7/2011 | Kane | |
| 8,903,843 B2 | 12/2014 | Farrelly | |
| 9,075,508 B1* | 7/2015 | Cronin | G06F 3/0482 |
| 9,195,477 B1* | 11/2015 | Spencer | G06F 8/54 |
| 9,721,021 B2* | 8/2017 | Klotz | G06F 17/3053 |
| 2006/0031196 A1* | 2/2006 | Oral | G06F 17/30696 |
| 2007/0063033 A1* | 3/2007 | Silverbrook | B41J 3/445 235/432 |
| 2007/0083894 A1 | 4/2007 | Gonsalves et al. | |
| 2009/0049540 A1 | 2/2009 | Khalil et al. | |
| 2010/0036737 A1 | 2/2010 | Shenfield et al. | |
| 2012/0005182 A1* | 1/2012 | Monteverde | G06F 17/30867 707/706 |
| 2012/0072428 A1 | 3/2012 | Kao et al. | |

(Continued)

OTHER PUBLICATIONS

U.S. Appl. No. 14/743,589, filed Jun. 18, 2015, Xueying Dai.
U.S. Appl. No. 14/744,378, filed Jun. 19, 2015, Xueying Dai.

*Primary Examiner* — Hung D Le
(74) *Attorney, Agent, or Firm* — Jefferson IP Law, LLP

(57) ABSTRACT

A method for personalizing deep search results using subscription data includes receiving usage data of one or more applications installed on a user device, and receiving a search query. The method further includes identifying one or more application states of the one or more installed applications based on the search query and the usage data, and generating personalized search results including one or more application access mechanisms of the identified one or more application states. Each application access mechanism has a reference to a corresponding installed application on the user device and indicates a performable operation for the corresponding installed application.

26 Claims, 18 Drawing Sheets

(56) References Cited

U.S. PATENT DOCUMENTS

| | | | | |
|---|---|---|---|---|
| 2012/0233009 | A1* | 9/2012 | Fougner | G06Q 50/01 |
| | | | | 705/26.3 |
| 2013/0110810 | A1* | 5/2013 | Eidesen | G06F 17/30864 |
| | | | | 707/708 |
| 2013/0173637 | A1* | 7/2013 | Kim | G06F 17/30283 |
| | | | | 707/748 |
| 2013/0290322 | A1* | 10/2013 | Prosnitz | G06F 17/30554 |
| | | | | 707/723 |
| 2013/0290344 | A1* | 10/2013 | Glover | G06F 17/3053 |
| | | | | 707/741 |
| 2013/0339334 | A1* | 12/2013 | Brown | G06F 17/30867 |
| | | | | 707/706 |
| 2014/0032707 | A1* | 1/2014 | Doshi | G06F 9/542 |
| | | | | 709/217 |
| 2014/0074915 | A1* | 3/2014 | Neill | G06F 9/44505 |
| | | | | 709/203 |
| 2014/0081915 | A1 | 3/2014 | Chow et al. | |
| 2014/0222819 | A1 | 8/2014 | Dies | |
| 2014/0222969 | A1 | 8/2014 | Darnell et al. | |
| 2014/0245186 | A1* | 8/2014 | Tseng | H04N 21/26291 |
| | | | | 715/753 |
| 2014/0250177 | A1 | 9/2014 | Sohn | |
| 2014/0250433 | A1* | 9/2014 | Stekkelpak | G06F 9/44505 |
| | | | | 717/176 |
| 2015/0220943 | A1* | 8/2015 | Dossick | G06Q 30/0201 |
| | | | | 705/7.29 |
| 2015/0262266 | A1* | 9/2015 | Curtis | G06Q 30/04 |
| | | | | 705/34 |
| 2015/0347585 | A1* | 12/2015 | Klotz | G06F 17/3053 |
| | | | | 707/706 |
| 2016/0119262 | A1* | 4/2016 | Siegel | H04L 51/066 |
| | | | | 709/206 |

* cited by examiner

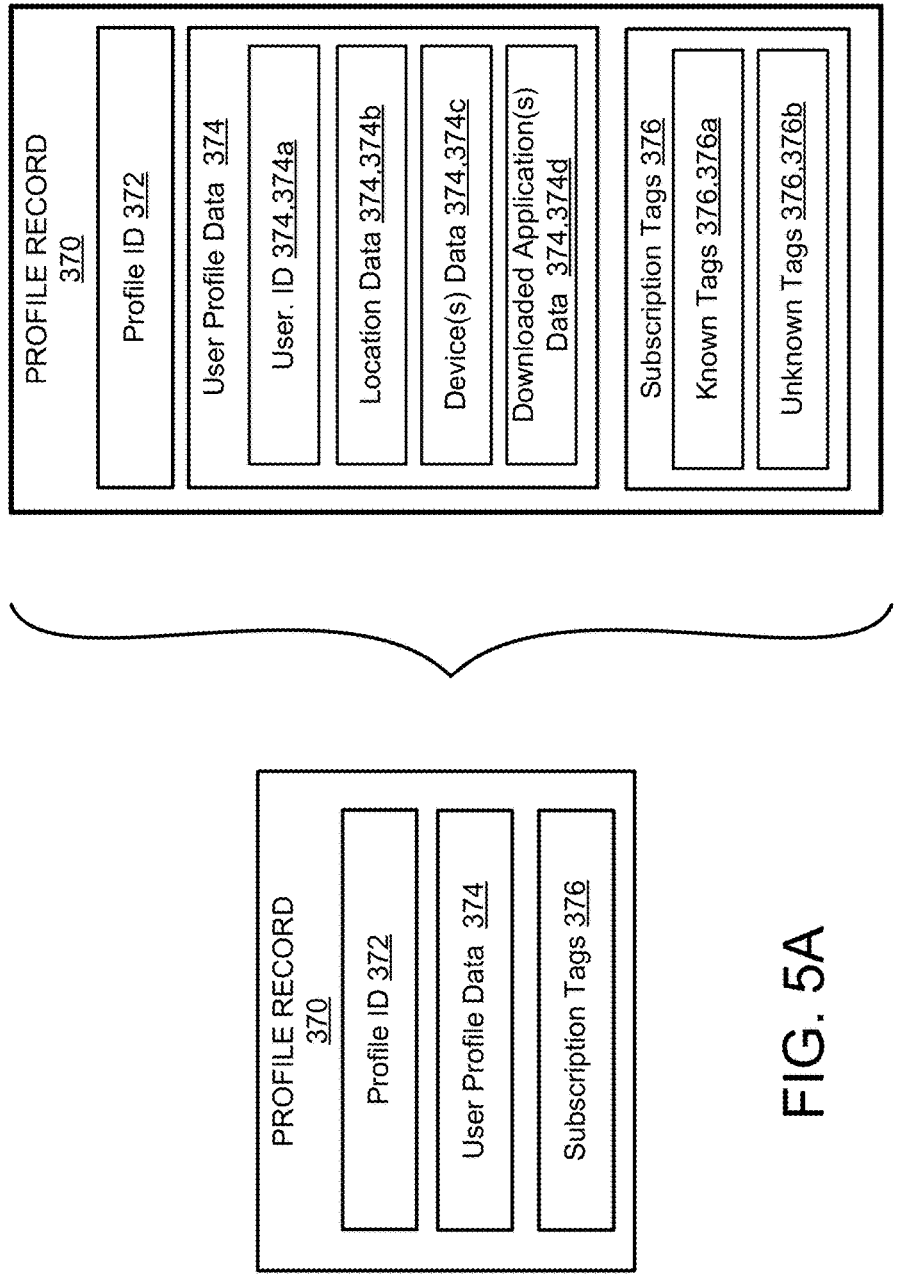

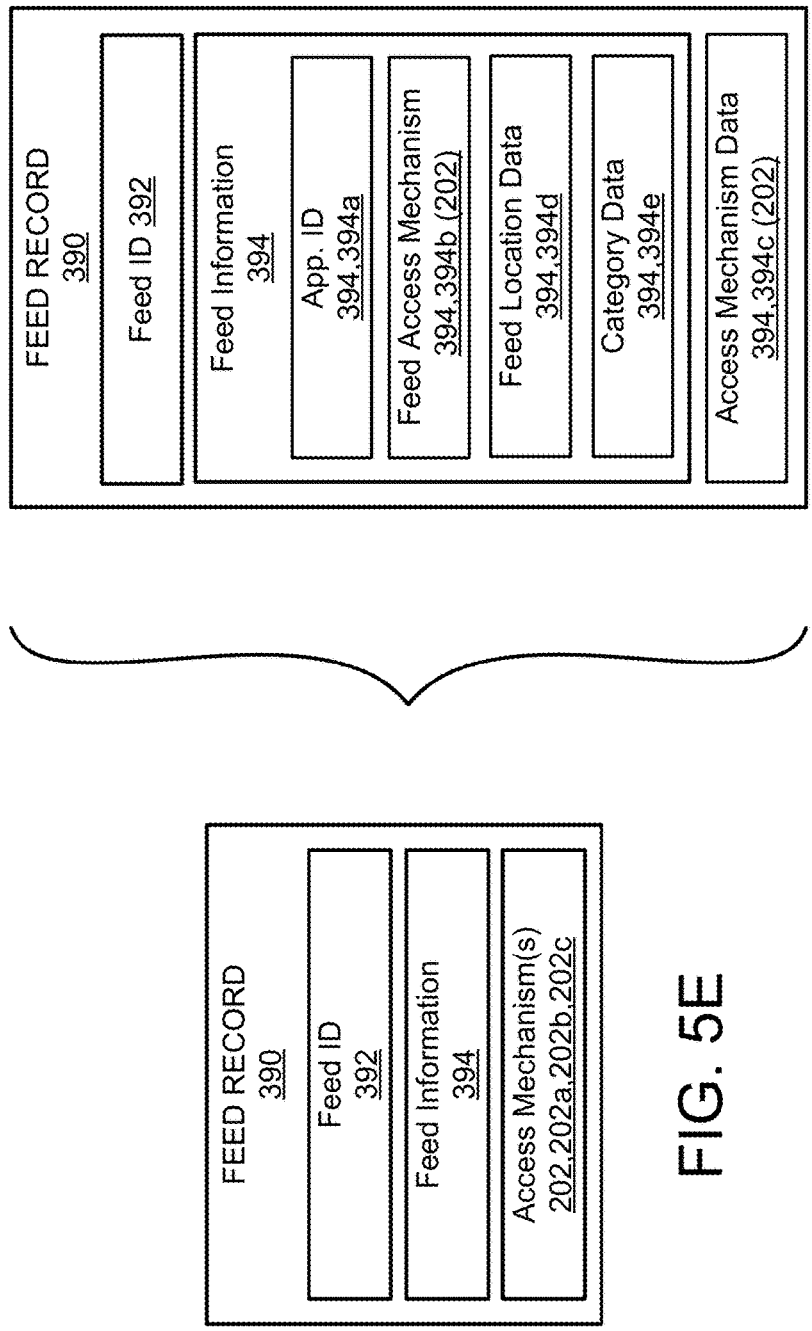

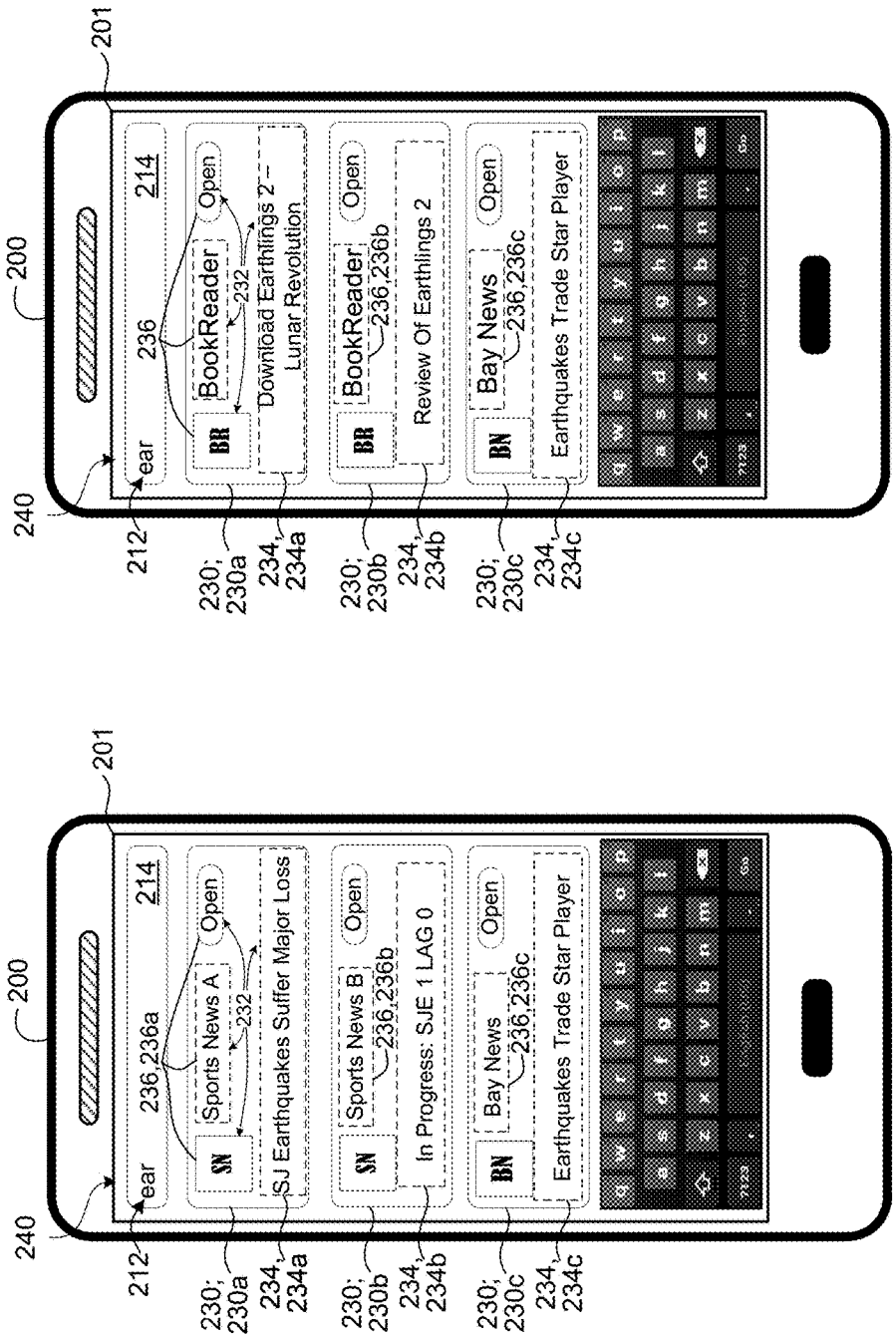

PERSONALIZING DEEP SEARCH RESULTS USING SUBSCRIPTION DATA

CROSS REFERENCE TO RELATED APPLICATIONS

This U.S. patent application claims priority under 35 U.S.C. § 119(e) to U.S. Provisional Application 62/099,088, filed on Dec. 31, 2014, and U.S. Provisional Application 62/186,968, filed on Jun. 30, 2015. The disclosures of these prior applications are considered part of the disclosure of this application and are hereby incorporated by reference in their entireties.

TECHNICAL FIELD

This disclosure relates to personalizing deep search results using subscription data.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Furthermore, application developers develop vast amounts of applications within each genre and each application may have numerous editions. Therefore, many applications provide broad content. For example, applications, such as YOUTUBE®, FACEBOOK®, TWITTER®, sports applications, and news applications offer content that span several different topics. Users of these applications may subscribe to specific content feeds.

SUMMARY

One aspect of the disclosure provides a method for personalizing deep search results using subscription data. The method includes receiving, at a computing device, usage data of one or more applications installed on a user device, and receiving a search query at the computing device. The method further includes identifying, by the computing device, one or more application states of the one or more installed applications based on the search query and the usage data and generating, by the computing device, personalized search results including one or more application access mechanisms of the identified one or more application states. Each application access mechanism has a reference to a corresponding installed application on the user device and indicates a performable operation for the corresponding installed application.

Implementations of the disclosure may include one or more of the following optional features. In some implementations, the method includes generating, at the computing device, a user profile associated with the user device. The user profile includes user profile data including device data defining at least one of a device location, a device operating system, or a list of applications installed on the user device. The user profile further includes subscription tags defining one or more user subscriptions to content access mechanisms. The method may include associating a score with each personalized search result based on a relevancy of each search result with the search query and the subscription tags of the user profile. The relevancy may be based on at least one of the subscription tags of the user, an age of the user, a home location, or a user device type. Each subscription tag may identify a corresponding installed application on the user device and an associated content feed of the installed application.

In some examples, for each subscription tag, the method includes determining whether contents of the subscription tag were previously crawled and have an associated feed record. When the contents of the subscription tag have not been crawled, the method includes crawling the contents of the subscription tag and generating a feed record based on the crawling of the contents of the subscription tag. The content feed may be accessible through a corresponding feed access mechanism having a reference to one of the one or more installed applications on the user device.

In some implementations, each personalized search result includes a content access mechanism having a reference to a corresponding installed application on the user device and indicating a content performable operation for the corresponding installed application. An application access mechanism may have a reference to the corresponding installed application on the user device and indicate a general performable operation for the corresponding installed application. The general performable operation is different from the content performable operation, wherein the content access mechanism is associated with the subscription tags, and the content access mechanism is different than the application access mechanism. Additionally or alternatively, the search result may further include a content user selectable link associated with the content access mechanism and an application user selectable link associated with the application access mechanism. The method may further include receiving, from the user device, an indication of a user selectable link and executing the access mechanism associated with the user selectable link.

Another aspect of the disclosure provides a second method for personalizing deep search results using subscription data. The method includes sending, from a computing device to a search system in communication with the computing device, data including application data indicating one or more applications installed on the computing device and subscription data defining one or more subscriptions to content feeds. Each subscription is associated with an application installed on the computing device. The method further includes sending, from the computing device to the search system, a search query and receiving, at the computing device, search results transmitted from the search system. Each search result includes a content access mechanism having a reference to a corresponding application that is installed on the computing device and associated with the usage data. The content access mechanism indicates a content performable operation for the corresponding application based on the usage data. The method further includes displaying, on a display in communication with the computing device, a graphical user interface including the search results, each search result including a content user selectable link associated with the corresponding content access mechanism.

In some implementations, the method includes receiving, at the computing device, an indication to execute the content access mechanism and executing, at the computing device, the content access mechanism, causing the corresponding application to enter a corresponding content application state, the corresponding content application state based on the search query and the usage data. Each search result may further include an application access mechanism having a reference to the corresponding application that is installed on the computing device, the application access mechanism indicating an application performable operation for the corresponding application, when executed by the application, causing the application to enter a general application state different than the content application state. Each search result may further include an application user selectable link associated with the application access mechanism.

In some examples, the method includes displaying the search results in an order based on a corresponding score associated with each search result, wherein each score is based on a relevancy of the search result to the search query and the usage data. The method further includes displaying the search results in an order based on a relevancy of the corresponding content access mechanism of each search result to the search query and the usage data. In some examples, the method includes sending, from the computing device to a subscription system in communication with the computing device, a subscription request to one or more of the content feeds, each content feed associated with a corresponding content access mechanism. Each content feed may be accessible through a corresponding feed access mechanism having a reference to one of the one or more applications installed on the computing device.

Yet another aspect of the disclosure provides a device for personalizing deep search results using subscription data. The user device includes a display, a computing device in communication with the display, and memory hardware (e.g., non-transitory memory) in communication with the computing device. The memory hardware stores instructions that when executed on the computing device, cause the computing device to perform operations. The operations include sending, from the computing device to a search system in communication with the computing device, data including application data indicating one or more applications installed on the computing device and subscription data defining one or more subscriptions to content feeds. Each subscription is associated with an application installed on the computing device. The operations further include sending, from the computing device to the search system, a search query, and receiving, at the computing device, search results transmitted from the search system. Each search result includes a content access mechanism having a reference to a corresponding application that is installed on the computing device and associated with the usage data. The content access mechanism indicates a content performable operation for the corresponding application based on the usage data. The operations may further include displaying, on a display in communication with the computing device, a graphical user interface including the search results, each search result includes a content user selectable link associated with the corresponding content access mechanism.

In some implementations, the operations include receiving, at the computing device, an indication to execute the content access mechanism and executing, at the computing device, the content access mechanism, causing the corresponding application to enter a corresponding content application state. The corresponding content application state is based on the search query and the usage data. Each search result may further include an application access mechanism having a reference to the corresponding application that is installed on the computing device. The application access mechanism indicates an application performable operation for the corresponding application, when executed by the application, causing the application to enter a general application state different than the content application state.

Each search result may further include an application user selectable link associated with the application access mechanism. The operations may further include displaying the search results in an order based on a corresponding score associated with each search result, wherein each score is based on a relevancy of the search result to the search query and the usage data. The operations may further include displaying the search results in an order based on a relevancy of the corresponding content access mechanism of each search result to the search query and the usage data. In some examples, the operations further include sending, from the computing device to a subscription system in communication with the computing device, a subscription request to one or more of the content feeds. Each content feed is associated with a corresponding content access mechanism. Each content feed may be accessible through a corresponding feed access mechanism having a reference to one of the one or more applications installed on the computing device.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 5A and 5B are schematic views of example profile records.

FIGS. 5E and 5F are schematic views of example feed records.

FIGS. 10A-10C are schematic views of example user devices displaying search results.

Like reference symbols in the various drawings indicate like elements.

DETAILED DESCRIPTION

A system of the present disclosure may personalize deep search results using subscription data. The subscription data may refer to any information related to one or more content feeds, such as Rich Site Summary (RSS) feeds, subscribed to by users. In some implementations, the system receives usage data of users. For each user, the usage data may include device usage data related to a user device of the user and/or subscription usage data associated with one or more applications installed on the user device. When executing a search or preparing search results, the system may identify, filter, and/or personalize search results based on the subscription data of the user requesting the search and/or other users having usage data similar to the user requesting the search.

In some implementations, the system executes a search based on a query received from the user device and identifies one or more application states of one or more applications installed on the user device based on the query and the usage data or, in particular, the subscription usage data. The system may generate personalized search results and transmit the results to the user device. The personalized search results may include one or more application access mechanisms of the identified one or more application states. Each application access mechanism has a reference to a corresponding installed application on the user device and indicates a performable operation for the corresponding installed application. In response to selection of an access mechanism, the user device may launch an application referenced in the application access mechanism and perform the one or more operations indicated in the application access mechanism.

The user device may execute a search application that allows a user of the device to input the search query. The user may opt to share usage data of applications installed on his/her phone. For example, a user may opt to share this information to enhance the overall experience of using the applications. The system, with consent from the user, may generate a user profile associated with the user of the application. The user profile includes user subscription data that the system uses to improve the overall user experience by providing customized search results.

Figure 1:
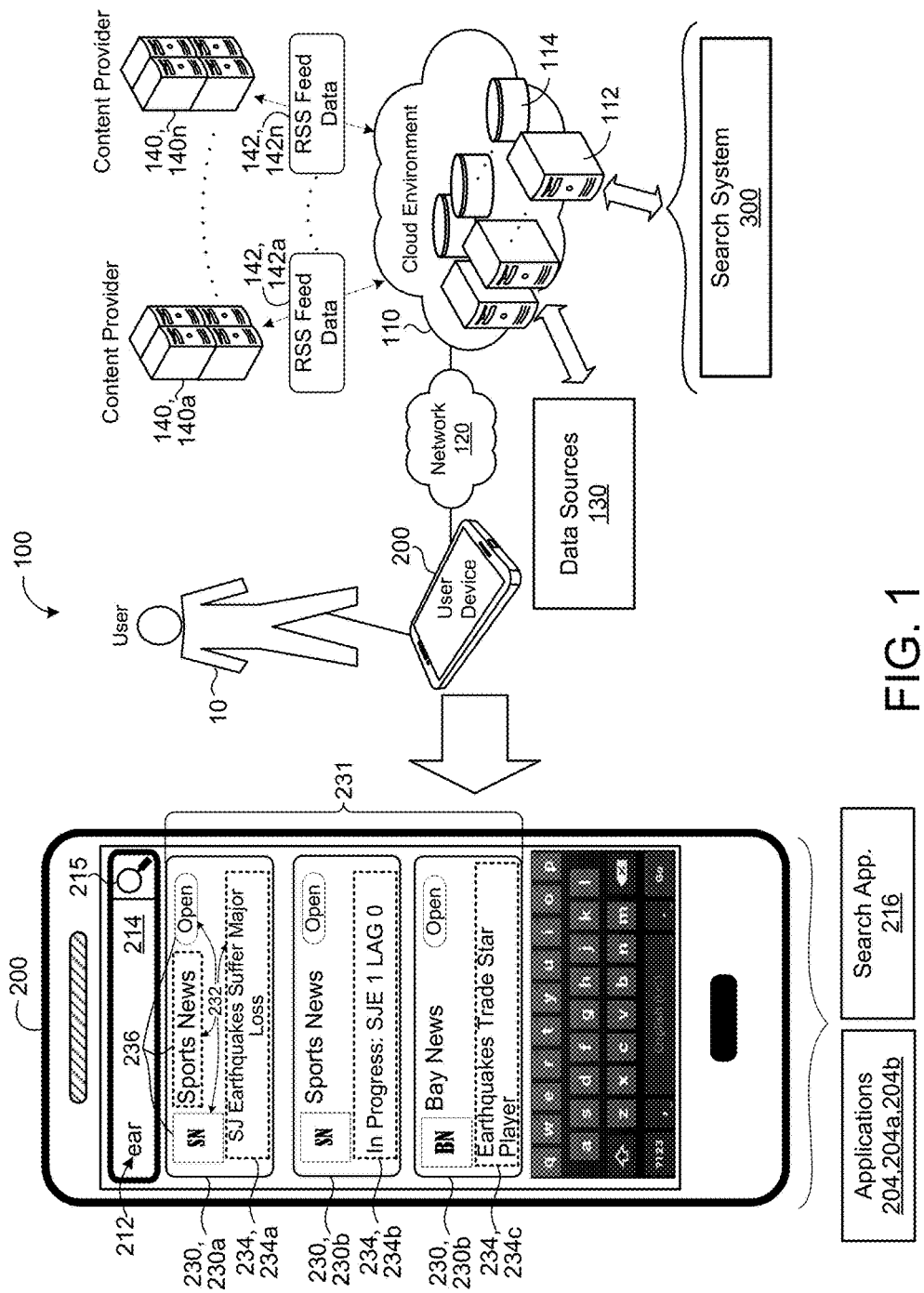
FIG. 1 is a schematic view of an example environment including a user device in communication with a search system and content providers.
Figure 2:
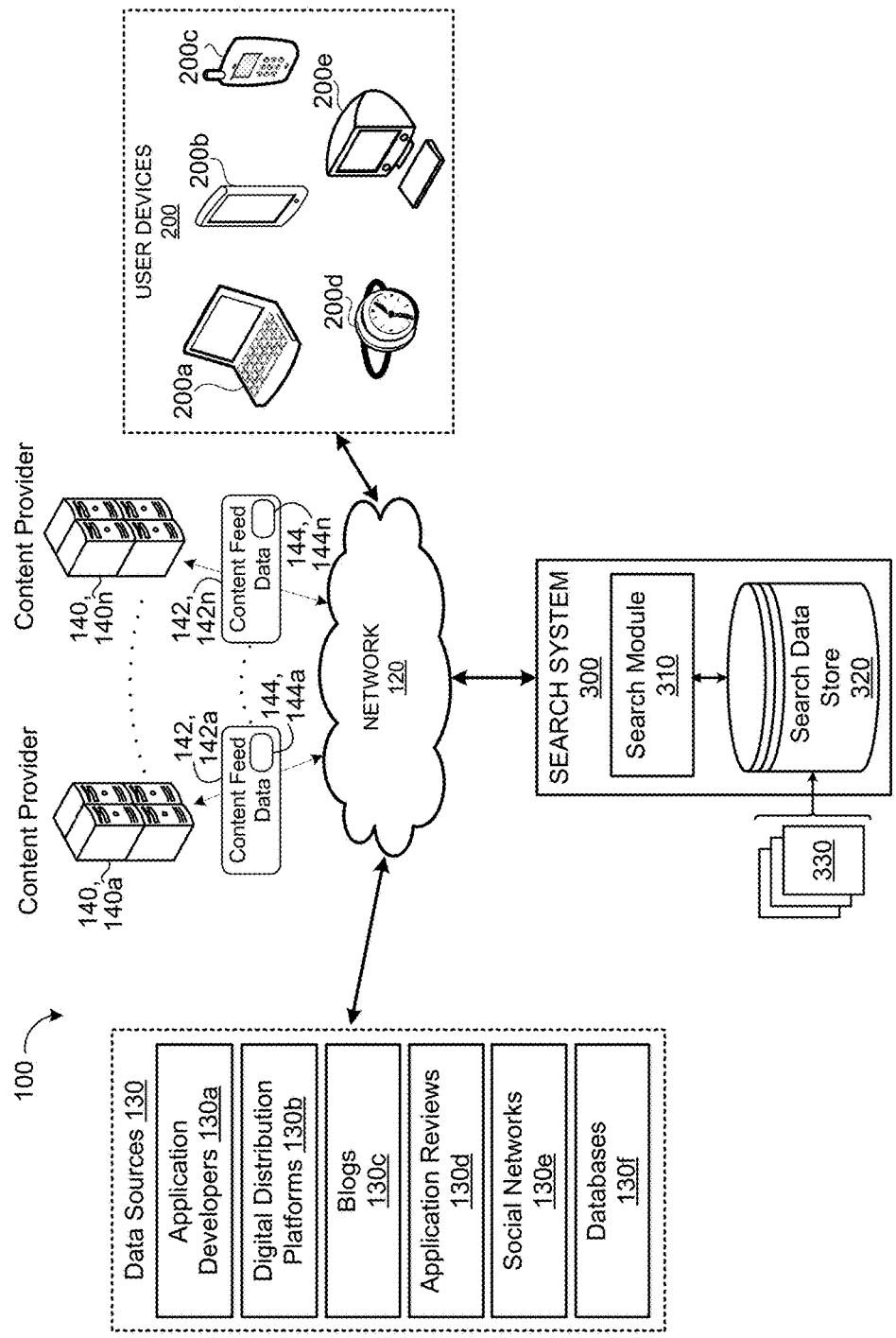
FIG. 2 is a functional block diagram of a search system interacting with user devices and data sources.
Figure 4A:
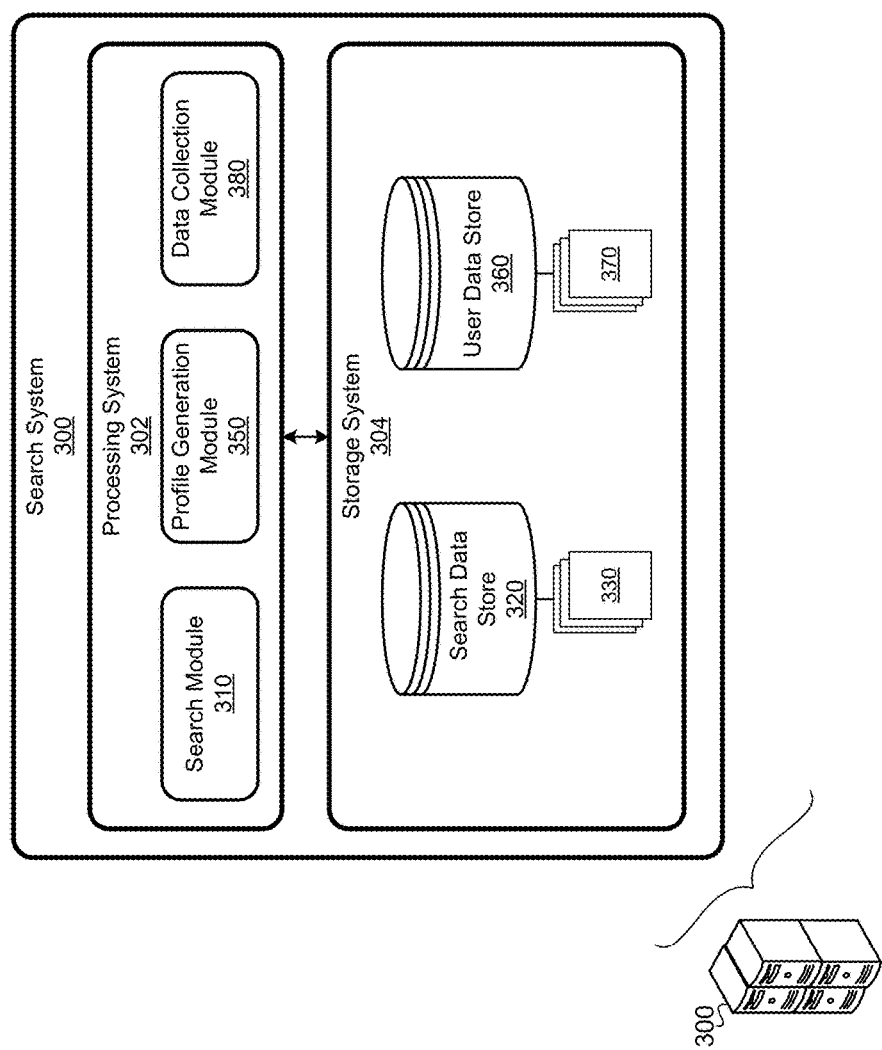
FIG. 4A is a functional block diagram of a search system including a profile system.
Figure 4B:
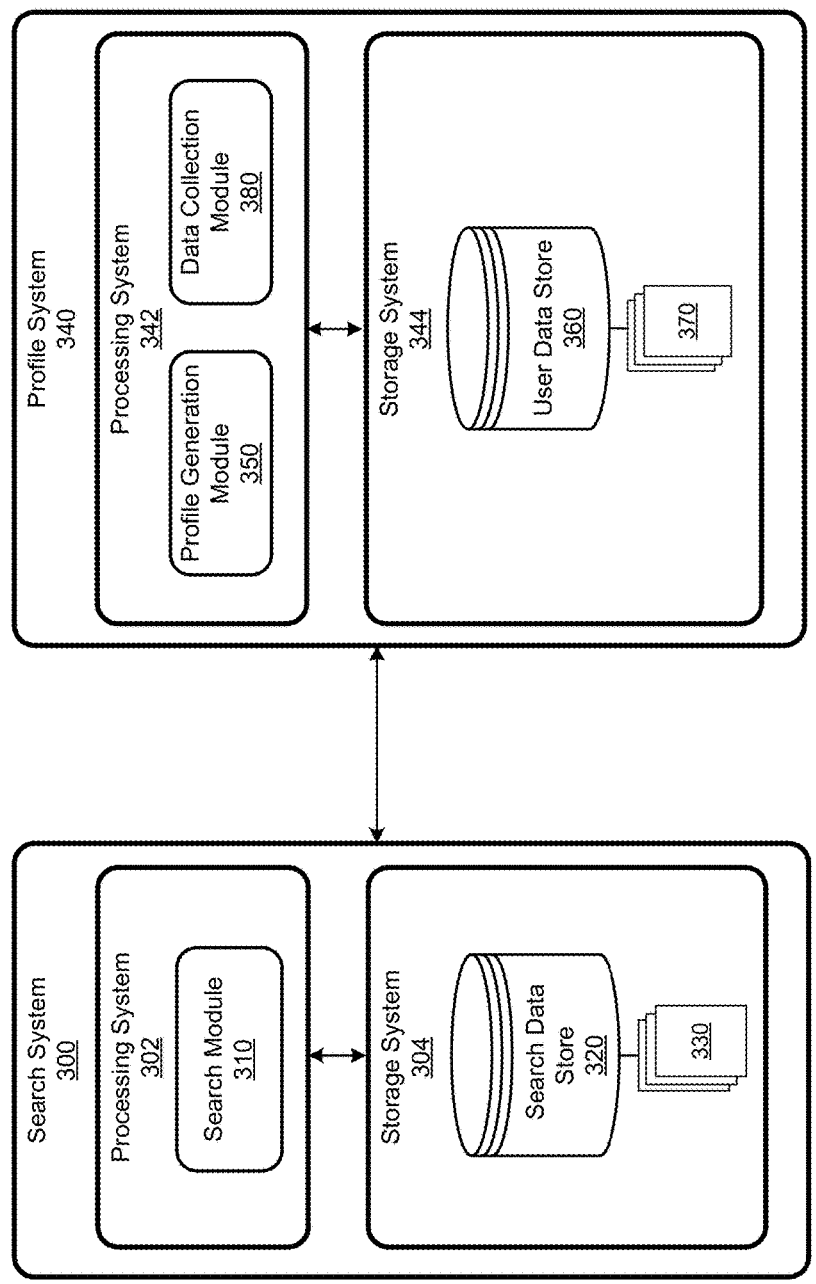
FIG. 4B is a functional block diagram of a search system in communication with a profile system.

FIG. 1 illustrates an example system 100 that includes a user device 200 associated with a user 10 in communication with a remote system 110 via a network 120. FIG. 2 provides functional block diagrams of the system 100. The remote system 110 may be a distributed system e.g., cloud environment) having scalable/elastic computing resources 112 and/or storage resources 114. The user device 200 and/or the remote system 110 may execute a search system 300 and optionally receive data from one or more data sources 130. In some examples, the search system 300 communicates with one or more user devices 200 and the data source(s) 130 via the network 120. The network 120 may include various types of networks, such as a local area network (LAN), wide area network (WAN), and/or the Internet. The user device 200 executes a search application 216 configured to receive a search query 212 (e.g., a search string) and send the search query 212 to the search system 300. Once the search system 300 executes the search, the user device 200 displays, via a graphical user interface 240 of a display 201, received search results. The executed search is based on a user profile record 370 (FIGS. 5A and 5B) generated by a profile generation module 350. In some examples, the profile generation module 350 is part of the search system 300 (as shown in FIG. 4A), while in other examples, the profile generation module 350 is separate and independent from the search system 300 and in communication with the profile generation module 350 via the network 120. For example, the profile generation module 350, the data collection module 380 and the user data store 360 (that stores user profile records 370) may be part of a profile system 340 (FIG. 4B) that communicates with the search system 300 via the network 120. As shown in FIG. 4B, the profile system 340 includes a processing system 342 that includes the profile generation module 350 and the data collection module 380, and a storage system 344 that includes the user data store 360.

FIG. 2 shows an example user device 200 in communication with the search system 300. User devices 200 can be any computing devices that are capable of providing queries 210, 212 to the search system 300. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as computing devices included in desktop computers 200e, vehicles, gaming devices, televisions, or other appliances (e.g., networked home automation devices and home appliances).

The user devices 200 may use a variety of different operating systems 224. In examples where a user device 200 is a mobile device, the user device 200 may run an operating system including, but not limited to, ANDROID® developed by Google IOS® developed by Apple Inc., or WINDOWS PHONE® developed by Microsoft Corporation. Accordingly, the operating system 224 running on the user device 200 may include, but is not limited to, one of ANDROID®, IOS®, or WINDOWS PHONE®. In an example where a user device 200 is a laptop 200a or desktop computing device 200e, the user device 200 may run an operating system 224 including, but not limited to, MICROSOFT WINDOWS® by Microsoft. Corporation, MAC OS® by Apple, Inc., or Linux. User devices 200 may also access the search system 300 while running operating systems 224 other than those operating systems 224 described above, whether presently available or developed in the future.

Referring back to FIGS. 1-3B, the search system 300 receives a search query 212 from a user device 200 and then the search system 300 performs a search within a search storage system 304 (e.g., a search data store 320 and a user data store 360). In some examples, it is desirable for the search system 300 to include personalized search results based on the search query 210, 212 and a user profile 370 (e.g., a user profile record).

The user 10 may be subscribed (via the user device 200) to one or more content feeds 142 (e.g., RSS feeds) provided by a content provider 140. The content feeds 142 may also be referred to as subscription data. The search system 300 may personalize search results 220 based on the user profile 370, which includes subscription data of a user's subscription to one or more content feeds 142. Types of content feeds 142 may include, but are not limited to, RSS feeds and Atom feeds.

In the example shown in FIG. 1, the user 10 entered the letters 'ear' in the search field 214 (e.g., a search box) of a graphical user interface (GUI) 240 of a search application 216 running on the user device 200 and the GUI displayed a list 231 of search results 230. Since the search results 230 are based on a search of the search data store 320 using the search query 212 and a user data store 360 that stores the user profile record 370, the search results 220 can be personalized based on the user profile record 370. The displayed search results 230 may be a combination of information from the data sources 130, search data store 320, a user data store 360, and content feeds from one or more content providers 140. Therefore, when the user 10 enters the letters 'ear' in the search field 214, the search system 300 considers the user profile 370, including the user subscriptions tags 376. For example, if the user profile 370 indicates that the user is located in San Jose and/or that the user 10 is subscribed to one or more content feeds relating to sports in the San Jose area, the search system 300 may provide search results 220 (i.e., displayed results 230) relating to the 'San Jose Earthquakes,' which are a professional soccer team based in San Jose, Calif.

To provide personalized displayed search results 230 to a user 10, the system 100 spiders, crawls, and indexes applications 204. Examples of data include, but are not limited to, news articles, blog posts, and sports scores. There are many content providers 140 that provide content feeds 142, where the content feed 142 provides near real-time data. RSS feeds utilize a standard family of Web feed formats to publish frequently updated content, such as blog entries, news articles, audio, and video. Content obtained from a content feed 142 may be referred to as a "content document" 144. In some examples, a content document 144 includes a web link, to the source of the content. For example, a web link to a news article. Generally, the broader class of web feeds 142 and equivalents thereof may be referred to as "content feeds," which may also include channel subscriptions. Traditionally, a user 10 subscribes to a content feed 142 and a client application (e.g., a content reader such as an RSS reader) monitors a site that provides the content feed 142 for new content documents 144, allowing the user 10 to receive new content documents 144 when it is available. Therefore, a content feed 142 may refer to a collection of grouped application states within an application 204. Put another way, a content feed 142 can represent content documents 144 of an application that is grouped for any suitable reason. The grouping can be made by other users 10 of the application or the application provider 140 ("content provider"). For example, a user 10 may subscribe to a YOUTUBE® channel, a FACEBOOK® feed (follow on FACEBOOK®), a team feed on ESPN® (e.g., follow DETROIT TIGERS®), a topic feed on THE NEW YORK TIMES® (e.g., Science and Tech news). In some of these examples, the user 10 of the application groups the content (e.g., YOUTUBE® and FACEBOOK®), while in other examples the content provider groups the content (e.g., ESPN® and THE NEW YORK TIMES®). The foregoing is all referred to as subscription data. Subscription data can refer to any information that indicates a set of content feeds 142 that a user 10 has expressly requested to receive from an application or a content provider 140. Thus, the current system 100 leverages the user's subscription data to content feeds 142 to enhance and personalize the search results 220 (i.e., the displayed search results 230).

In some implementations, the user device 200 executes one or more software applications 204. A software application 204 may refer to computer software that, when executed by a computing device, causes the computing device to perform a task. In some examples, a software application 204 is referred to as an "application", an "app", or a "program". Example software applications 204 include, but are not limited to, word processing applications, spreadsheet applications, messaging applications, media streaming applications, social networking applications, and games.

Applications 204 can be executed on a variety of different user devices 200. In some examples, a native application 204a is installed on a user device 200 prior to a user 10 purchasing the user device 200. In other examples, the user may 10 download and install native applications 204a on the user device 200.

The functionality of an application 204 may be accessed on the computing device 200 on which the application 204 is installed. Additionally, or alternatively, the functionality of an application 204 may be accessed via a remote computing device 112. In some examples, all of an application's functionality is included on the computing device 112, 200 on which the application 204 is installed. These applications 204 may function without communication with other computing devices 112, 200 (e.g., via the Internet). In other examples, an application 204 installed on a computing device 200 may access information from other remote computing devices 112 during operation. For example, a weather application installed on a computing device 200 may access the latest weather information via the Internet and display the accessed weather information to the user 10 through the installed weather application. In still other examples, a web-based application 204b (also referred to herein as a web application) may be partially executed by the user's computing device 200 and partially executed by a remote computing device 112. For example, a web application 204b may be an application 204 that is executed, at least in part, by a web server and accessed by a web browser (e.g., a native application 204a) of the user's computing device 200. Example web applications 204b may include, but are not limited to, web-based email, online auctions, and online retail sites.

In general, the user device 200 may communicate with the search system 300 using any software application 204 that can transmit search queries 212 to the search system 300. In some examples, the user device 200 runs a native application 204a that is dedicated to interfacing with the search system 300, such as a native application 204a dedicated to searches (e.g., a search application 216). In some examples, the user device 200 communicates with the search system 300 using a more general application 204, such as a web-browser application 204b accessed using a web browser native application 204a. Although the user device 200 may communicate with the search system 300 using the native search application 216 and/or a web-browser application 204b, the user device 200 may be described hereinafter as using the native search application 216 to communicate with the search system 300. In some implementations, the functionality attributed to the search application 216 is included as a searching component of a larger application 204 that has additional functionality. For example, the functionality attributed to the search application 216 may be included as part of a native application 204a or a web application 204b as a feature that provides search capabilities.

Native applications 204a can perform a variety of different functions for a user 10. For example, a restaurant reservation application can make reservations for restaurants. As another example, an internet media player application can stream media (e.g., a song or movie) from the Internet. In some examples, a single native application 204a can perform more than one function. For example, a restaurant reservation application may also allow a user 10 to retrieve information about a restaurant and read user reviews for the restaurant in addition to making reservations. As another example, an interact media player application may also allow a user 10 to perform searches for digital media, purchase digital media, and generate media playlists.

Figure 3A:
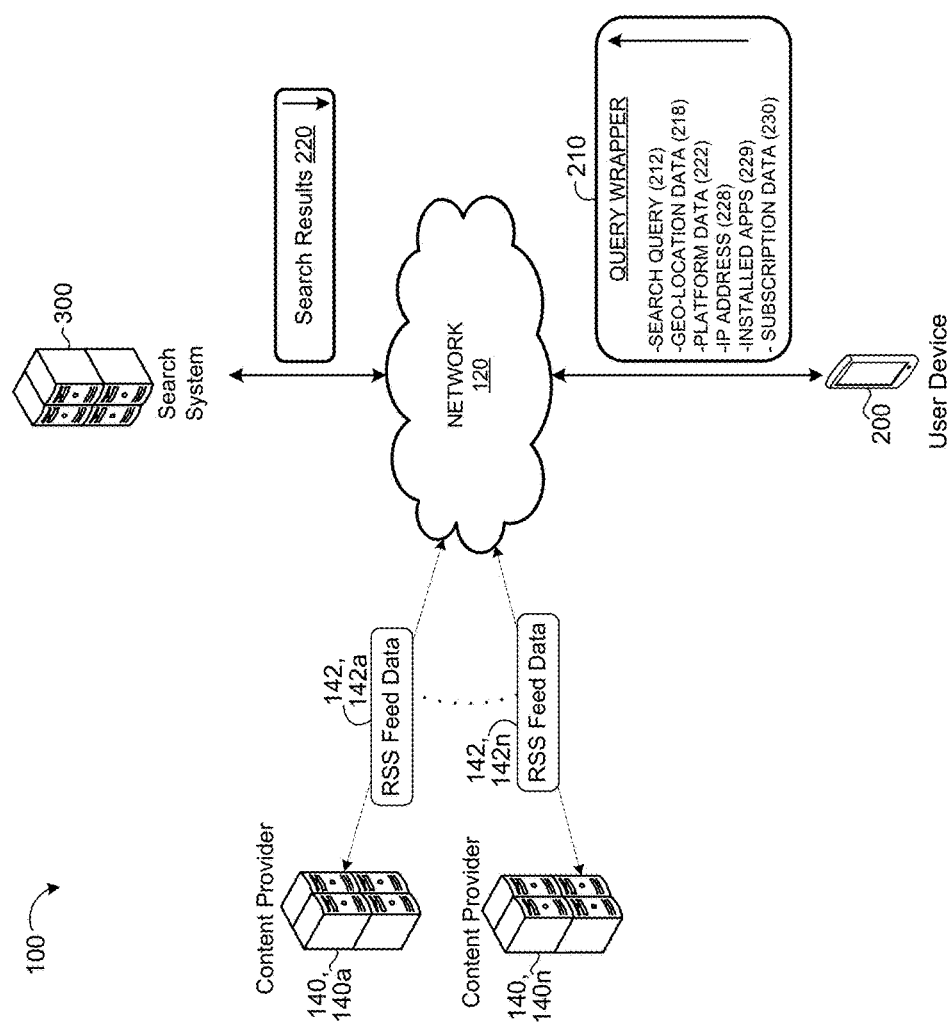
FIGS. 3A and 3B are schematic views of example user devices in communication with a search system.
Figure 3B:
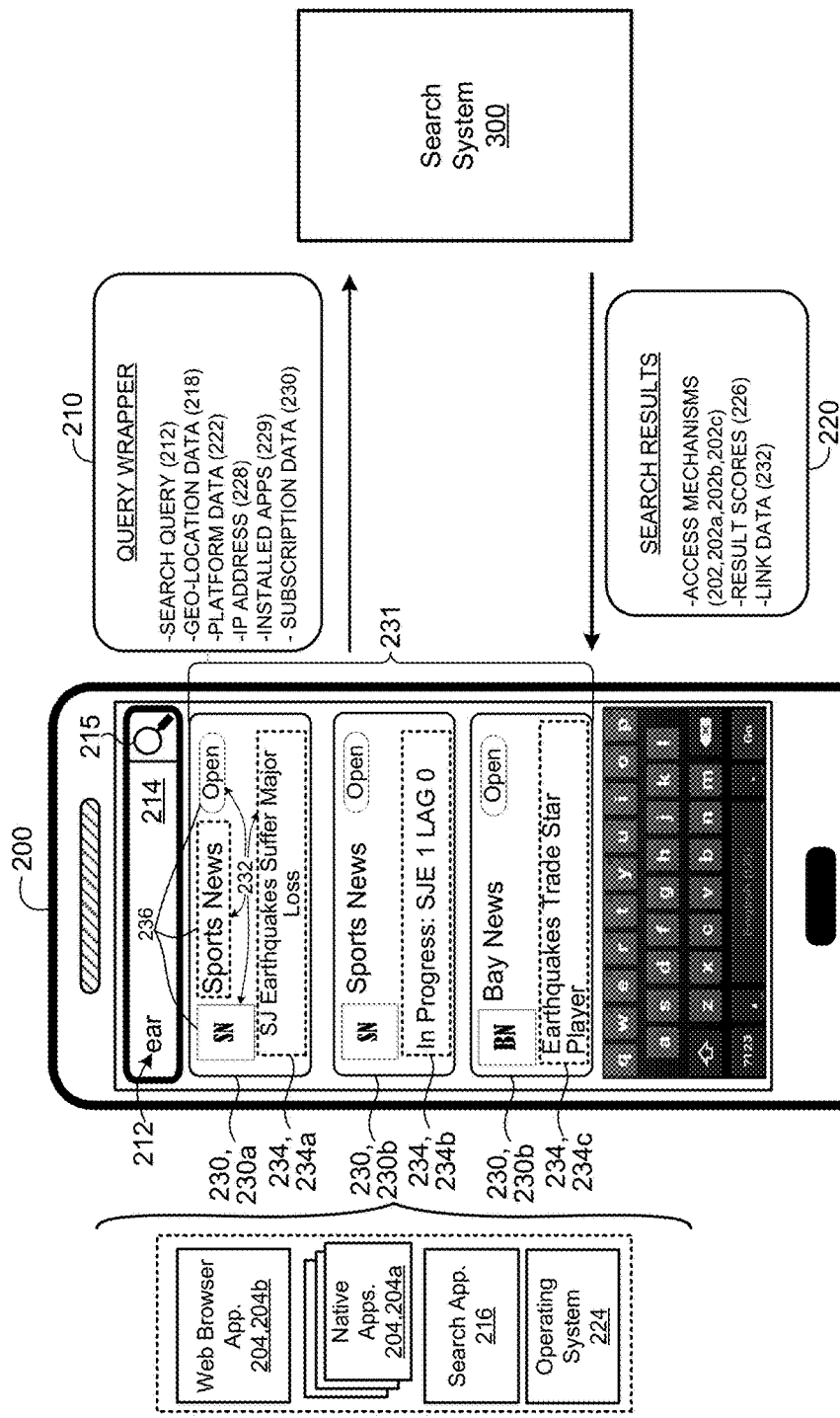

Referring to FIGS. 1, 2, and 3B, the search system 300 includes a search module 310 in communication with a search data store 320. The search data store 320 may include one or more databases, indices (e.g., inverted indices), tables, files, or other data structures, which may be used to implement the techniques of the present disclosure. The data sources 130 may include a variety of different data providers. The data sources 130 may include data from application developers 130a, such as application developers' websites and data feeds provided by developers. The data sources 130 may include operators of digital distribution platforms 130b configured to distribute native applications 204a to user devices 200. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include other websites, such as websites that include web logs 130c (i.e., blogs), application review websites 130d, or other websites including data related to applications. Additionally, the data sources 130 may include social networking sites 130e, such as "FACEBOOK®" by Facebook, (e.g., Facebook posts) and "TWITTER®" by Twitter Inc. (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

The search system 300 retrieves data from one or more of the data sources 130. The data retrieved from the data sources 1130 may include any type of data related to application functionality and/or application states. The search system 300 generates application state records 330 based on the data retrieved from the data sources 130. In some examples, a human operator manually generates some data included in the application state records 330. The search system 300 may update data included in the application state records 330 over time so that the search system 300 provides up-to-date results 220.

Referring to FIGS. 1-5F, the search system 300 determines personalized search results 220 based on a received search query 212 and a user profile record 370 (stored in the user data store 360). Referring to FIG. 4A, the search system 300 may include a processing system 302 and non-transitory storage system 304. The processing system 302 may include the search module 310, a profile generation module 350, and data collection module 380. In some examples, the search system 300 determines the personalized search results 220 based on a received query wrapper 210, which includes a search query 212.

Referring to FIGS. 4-5B, the profile generation module 350 generates user profile records 370 and stores the generated user profile records 370 in the user data store 360. In some examples, the user 10 wants to share usage data of his/her usage of one or more applications installed on the user device 200. When the user 10 gives/allows the search system 300 permission to access his/her data usage, the profile generation module 350 (executing on the user device 200 or in communication with the user device 200) generates a user profile record 370 of a user 10. In some examples, the search system 300 executes an application programming interface (API) for accessing the subscription data; while in other examples, the user 10 manually enters the subscription data. The profile generation module 350 generates a profile record 370 associated with each user 10. In some example, the profile record 370 is associated with one device 200 of a user 10; while in other examples, the profile record 370 is associated with more than one user device 200 of the same user 10. For example, a user 10 may have at least two of a laptop 200a, a tablet 200b, a smart phone 200c, a wearable computing device 200d (see FIG. 1), and desktop computers 200e; therefore, the profile record 370 of a user 10 is associated with ail the devices 200 of that user 10. The profile record 370 includes a profile identifier (ID) 372, user profile data 374, and user subscription tags 376 (in some examples, the user subscription tags 376 are part of the user profile data 374). The profile ID 372 uniquely identifies a user 10 associated with the profile record 370. The user profile data 374 may indicate any suitable information relating to the user 10 or the one or more user device(s) 200. User profile data 374 may include a user ID 374a that uniquely identifies each user 10, a city/state/country of the user 10 (e.g., location data 374b), one or more devices 200 of the user 10 (e.g., device data 374c), and applications 204 downloaded by the user 10 on the user device 200 and/or applications 204 installed on the user device 200 installed by the manufacturer of the device and not the user 10 (e.g., application(s) data 374d). The subscription tags 376 indicate one or more subscription(s) of the user 10 to one or more content feed(s) 142. For example, a subscription tag 376 may be an ordered pair that indicates the application 204 and the content feed 142. For example, a subscription tag 376 may take the form (application, feed) (e.g., (ESPN®, DETROIT LIONS®) or (YOUTUBE®, Funny_stuff). In other implementations, the subscription tags 376 may be alphanumeric strings that represent the ordered pair. The ordered pairs may be stored in a lookup table that is indexed by the alphanumeric strings in the user data store 360. The subscription tags 376 may be known subscription tags 376a or unknown subscription tags 376b. Known tags 376a are tags that have been crawled before, while unknown subscription tags 376b are tags to content feeds 142 that may have only few followers and the corresponding data 144 has not been crawled before. The profile generation module 350 may obtain the user's subscription data by accessing the application data of the user's installed applications 204 (e.g., native applications 204a).

The data collection module 380 identifies content feeds 142 for data or document 144 retrieval. In some implementations, the data collection module 380 searches a digital distribution platform 130b to identify popular applications 204. For these applications 204, the data collection module 380 may filter applications 204 that provide content (e.g., news, lifestyle, video streaming, etc.) and may forego other types of applications (e.g., games, productivity, etc.). For each of the content providing applications 204, the data collection module 380 may visit the website of the content provider 140 that offers the website to find the address of the website (e.g., https://play.google.com/store/apps/details?id=com.cnn.mobile.android.phone) and identify the website associated with the web developer (http://www.cnn.com/). In this example, the data collection module 380 finds the "find website" link in the Play Store CNN Breaking News application page and accesses the website of the application 204. After locating the website (i.e., CNN Breaking News application page), the data collection module 380 parses the website of the content provider 140 (e.g., CNN) to find a link to subscribe to a content feed 142 provided by the content provider 140. Once subscribed to the content feed 142, the data collection module 380 creates a feed record 390 (FIGS. 5E and 5F) corresponding to the content feed 142 (or RSS feed 142).

Figure 5D:
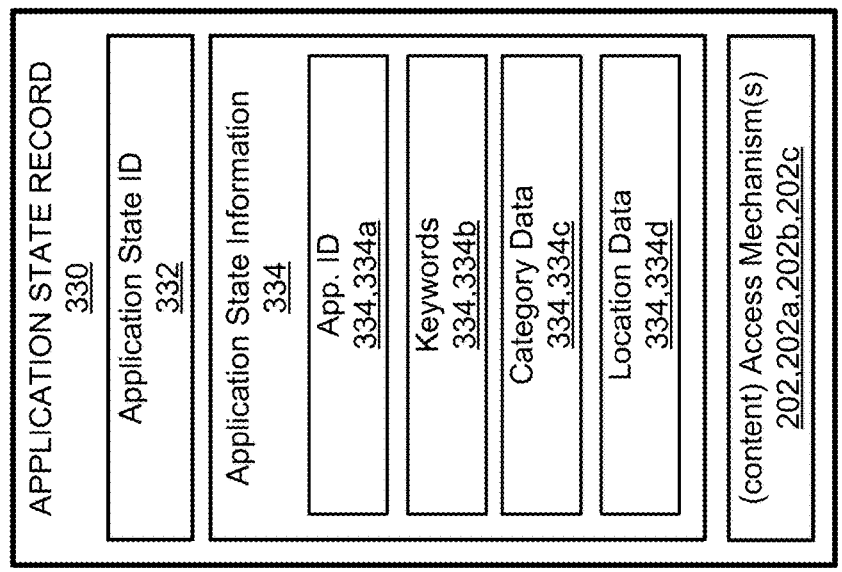
FIGS. 5C and 5D are schematic views of example application state records.
Figure 5C:

Referring to FIGS. 5C and 5D, the search data store 320 includes a plurality of different application state records 330. Each application state record 330 may include data related to a function of an application 204 and/or the state of the application 204 resulting from performance of the function. An application state record 330 may include an application state identifier (ID) 332, application state information 334, an application identifier (ID) 334a, and one or more access mechanisms 202, 202a, 202b, 202c used to access functionality provided by an application 204.

The application state ID 332 may be used to identify the application state record 330 among the other application state records 330 included in the search data store 320. Each application state record 330 may be associated with a feed record 390 having associated documents 144. The application state record 330 may provide access to a document 144 of the content feed 142 associated with the feed record 390. In some implementations, an application state ID 332 is a string of alphabetic, numeric, and/or symbolic characters (e.g., punctuation marks) that uniquely identify a state of an application 204. Put another way, an application state ID 332 may be a unique reference to a state of an application. In some implementations, an application state ID 332 can be in the format of a resource identifier. For example, the application state ID 332 may be a uniform recourse locator (URL) or an application resource identifier. In these implementations, the application state ID 332 may be used by a user device 200 to access a web application or one or more editions of a native application 204a, respectively. In some implementations, an application state ID 332 can map to one or more access mechanisms. In these implementations, the application state ID 332 may map to a web resource identifier (e.g., a URL) and/or one or more application resource identifiers. For instance, a state of an example software application, exampleapp, may be accessed via a web application edition and two native application editions (e.g., an edition configured for the ANDROID® operating system and an edition configured for the WINDOWS PHONE® operating system). In this example, the web resource identifier may be www.exampleapp.com/param1=abc¶m2=xyx, the first application resource identifier may be android.exampleapp::param1=abc¶m2:=xyx, and the second application resource identifier may be windows.exampleapp::param1=abc¶m2=xyx. In this example, an application state ID 332 maps to the web resource identifier and the two application resource identifiers. An application state ID 332 may have a URL-like structure that utilizes namespace other than http://, such as "func://", which indicates that the string is an application state ID 332. In the example of "exampleapp" above, the application state ID 332 corresponding to the example state may be func://exampleapp::param1=abe¶m2=xyx, which maps to the access mechanisms 202 described above. In another example, an application state ID 332 may take the form of a parameterizable function. For instance, an application state ID 332 may be in the form of "app_id[action(parameter_1, . . . , parameter_n)], where app_id is an identifier (e.g., name) of a software application, action is an action that is performed by the application (e.g., "view menu"), and parameter_1 . . . parameter_n are n parameters that the software application receives in order to access the state corresponding to the action and the parameters. Drawing from the example above, an application state ID 332 may be "exampleapp[example_action(abc, xyz)]. Given this application state ID 332 and the referencing schema of the example application, the foregoing application state ID 332 may be used to generate the access mechanisms defined above. Additionally or alternatively, the above example application state ID 332 may map to the access mechanisms defined above. Furthermore, while application state IDs 332 have been described with respect to resource identifiers, an application state 332 may map to one or more scripts that access a state of a software application or may be utilized to generate one or more scripts that access a state of the software application. Some software applications may have a common scheme for accessing all of their respective native application editions. In such scenarios, a single application resource identifier may access multiple application editions.

In a more specific example, if the application state record 330 describes a function of the YELP® native application, the application state ID 332 may include the name "Yelp" along with a description of the application state described in the application state information 334. For example, the application state ID 332 for an application state record 330 that describes the restaurant named "The French Laundry" may be "Yelp—The French Laundry." In an example where the application state ID 332 includes a string in the format of a URL, the application state ID 332 may include the following string "http://www.yelp.com/biz/the-french-laundry-yountville-2?ob=1" to uniquely identify the application state record 330. In additional examples, the application state ID 332 may include a URL using a namespace other than "http://," such as "func://," which may indicate that the URL is being used as an application state in an application state record 330. For example, the application state ID 332 may include the following string "func://www.yelp.com/biz/the-french-laundry-yountville-2?ob=1."

The application state information 334 may include data that describes an application state into which an application 204 is set according to the access mechanism(s) 202 in the application state record 330. Additionally or alternatively, the application state information 334 may include data that describes the function performed according to the access mechanism(s) 202 included in the application state record 330. The application state information 334 can include text, numbers, and symbols that describe the application state. The types of data included in the application state information 334 may depend on the type of information associated with the application state and the functionality specified by the application access mechanism 202a. The application state information 334 may include a variety of different types of data, such as structured, semi-structured, and/or unstructured data. The application state information 334 may be automatically and/or manually generated based on documents retrieved from the data sources 130. Moreover, the application state information 334 may be updated so that up-to-date search results 220 can be provided in response to a search query 212.

In some examples, the application state information 334 includes data that is presented to the user 10 by an application 204 when the application 204 is set in the application state defined by the access mechanism(s) 202. For example, if one of the access mechanism(s) 202 is an application access mechanism 202a, the application state information 334 may include data that describes a state of the native application 204a after the user device 200 has performed the one or more operations indicated in the application access mechanism 202a. For example, if the application state record 330 is associated with a shopping application, the application state information 334 may include data that describes products (e.g., names and prices) that are shown when the shopping application is set to the application state defined by the access mechanism(s) 202. As another example, if the application state record 330 is associated with a music player application, the application state information 334 may include data that describes a song (e.g., name and artist) that is played when the music player application is set to the application state defined by the access mechanism(s) 202.

The types of data included in the application state information 334 may depend on the type of information associated with the application state and the functionality defined by the access mechanism(s) 202. For example, if the application state record 330 is for an application 204 that provides reviews of restaurants, the application state information 334 may include information (e.g., text and numbers) related to a restaurant, such as a category of the restaurant, reviews of the restaurant, and a menu for the restaurant. In this example, the access mechanism(s) 202 may cause the application 204 (e.g., a native application 204a or a web-browser application 204b) to launch and retrieve information for the restaurant. As another example, if the application state record 330 is for an application 204 that plays music, the application state information 334 may include information related to a song, such as the name of the song, the artist, lyrics, and listener reviews. In this example, the access mechanism(s) 202 may cause the application 204 to launch and play the song described in the application state information 334.

The search system 300 may generate application state information 334 included in an application state record 330 in a variety of different ways. In some examples, the search system 300 retrieves data to be included in the application state information 334 via partnerships with database owners and developers of native applications 204a. For example, the search system 300 may automatically retrieve the data from online databases 130f that include, but are not limited to, data related to movies, television programs, music, and restaurants. In some examples, a human operator manually generates some data included in the application state information 334. The search system 300 may update data included in the application state information 334 over time so that the search system 300 provides up-to-date results 220.

The application ID 334a may be used to identify a native application 204a associated with the application state record 330. The application ID 334a may be a string of alphabetic, numeric, and/or symbolic characters (e.g., punctuation marks) that uniquely identifies the associated native application 204a. In some examples, the application ID 334a is native application 204a in human readable form. For example, the application ID 334a may include the name of the application 204 referenced in the access mechanism(s) 202. In a specific example, the application ID 334a for a restaurant finder application 204 may include the name of the restaurant finder application.

An application state record 330 including an application access mechanism 202 that causes an application 204 to launch into a default state may include application state information 334 describing the native application 204a, instead of any particular application state. For example, the application state information 334 may include the name of the developer of the application 204, the publisher of the application 204, an application identifier (ID) 334a identifying the application associated with the application state record 330, keyword 334b relating to the access mechanism 202 content (e.g., documents 144), a category 334c (e.g., genre) of the application 204, location data 334d associated with the application state record 330 or the application providing the application ID 334a, a description of the application 204 (e.g., a developer's description), and the price of the application 204, or any other relevant data. The application state information 334 may also include security or privacy data about the application 204, battery usage of the application 204, and bandwidth usage of the application 204. The application state information 334 may also include application statistics. Application statistics may refer to numerical data related to a native application 204a. For example, application statistics may include, but are not limited to, a number of downloads, a download rate (e.g., downloads per month), a number of ratings, and a number of reviews. In some examples, the access mechanisms 202 of an application state record 330 are based on or are generated from the feed access mechanism data 394c, which provides a user 10 access to the feed document 144.

In some implementations, an application state record 330 includes multiple different application access mechanisms 202, 202a, 202b, 202c that include a variety of information. The application access mechanism 202 may include edition information that indicates the application edition with which the application access mechanism 202 is compatible. For example, the edition information may indicate the operating system 224 with which the application access mechanism 202 is compatible. Moreover, different application access mechanisms 202 may be associated with different editions of a native application 204a. A native application edition (hereinafter "application edition") refers to a particular implementation or variation of a native application 204a. For example, an application edition may refer to a version of a native application 204a, such as a version 1.0 of a native application 204a or a version 2.0 of a native application 204a. In another example, an application edition may refer to an implementation of a native application 204a for a specific platform, such as a specific operating system 224.

The different application access mechanisms 202 included in an application state record 330 may cause the corresponding application editions to launch and perform similar functions. Accordingly, the different application access mechanisms 202 included in an application state record 330 may cause the corresponding application editions to be set into similar application states. For example, if the different application access mechanisms 202 reference different editions of an information retrieval application, the different application access mechanisms 202 may cause the corresponding application editions to retrieve similar information. In another example, if the different application access mechanisms 202 reference different editions of an internet music player application, the different application access mechanisms 202 may cause the corresponding application editions to play the same song.

In some examples, an application state record 330 for a native application that retrieves restaurant information includes multiple different application access mechanisms 202 for multiple different application editions. Assuming the application state record 330 is associated with a specific Mexican restaurant, the application access mechanisms 202 for the different application editions may cause each application edition to retrieve information for the same specific Mexican restaurant. For example, a first application access mechanism 202 may cause a first application edition (e.g., on a first OS) to retrieve information for the specific Mexican restaurant. A second application access mechanism 202 may cause a second application edition (e.g., on a second OS) to retrieve information for the specific Mexican restaurant. In some examples, the search system 300 determines whether to transmit the application access mechanism 202 in the search results 220 based on whether the user device 200 can handle the application access mechanism 202.

FIGS. 5E and 5F illustrate exemplary feed records 390. A feed record 390 may indicate a feed identifier (ID) 392, identifying the content feed 142, and feed information 394. Feed information 394 may include an application ID 394a of an application that provides the content feed 142, a feed access mechanism 394b, 202 from which the content of the content feed 142 is received (e.g., a URL of the content or RSS feed), access mechanism data 394c that defines templates, rules, and/or instructions for generating access mechanisms 394b to access content obtained from the content feed 142, feed location data 394d that indicates geographic regions to which the content feed 142 is pertinent, and feed category data 394e that indicates the different categories of content that are obtained from the content feed 142 (e.g., US News, All News, Sports, Science, Tech, Entertainment, etc.). In some examples, while the data collection module 380 is generating feed records 390, the data collection module 380 also tags the feed record 390 with the location data 394d. The location data 394d of the feed record 390 may be inherited by the application state records 330 (e.g., location data 334d of the application state record 330, which is associated with the application state record 330 or the application providing the application ID 334a). In some examples, the location data 394d is generated from the content obtained from the content feed 142. Thus, the generated feed geolocation data 394d allows the system 100 to personalize and localize the feed documents 144 (i.e., the feed contents) to a specific user 10.

The data collection module 380 utilizes the subscription tags 376 to identify potential content feeds 142 of the content providers 140 to spider and crawl. In particular, many content feeds 142 within applications 204 are not readily known. For example, there are thousands or millions of YOUTUBE® channels, many of which only have few followers who follow the channel. Thus, it may be a difficult task for a crawler to find the remote content associated with the YOUTUBE® channel that has the few followers. Thus, the data collection module 380 may utilize subscription tags 376 of the newly discovered content feeds 142 to identify content feeds 142 that may be crawlable. In some implementations, the profile generation module 350 verifies whether a subscription tag 376 is a known subscription tag 376a or an unknown subscription tag 376b, and each time the profile generation module 350 identifies an unknown subscription tag 376b, the profile generation module 350 may add the unknown subscription tag 376b to a set of unknown subscription tags 376b. The data collection module 380 can utilize the set of unknown subscription tags 376b to determine how to spider and crawl an application. As the data collection module 380 crawls a new application state, the data collection module 380 creates an application state record 330 (FIGS. 5B and 5C) or a feed records 390 (FIGS. 5D and 5E) corresponding to the newly crawled state. If the application state belongs to a content feed 142, the application record 330 is tagged with a subscription tag 376. In this way, the application state record 330 indicates that the document 144 obtained at the particular application state is accessible through the content feed 142.

In some examples, the user 10 selects a search button 215, after entering a search query 212 in the search text box 214, which triggers the search system 300 to execute the search. While in other examples, the system executes an incremental search, e.g., an incremental search query 212. Incremental search queries 212 refer to search queries 212 that are updated each time the user 10 enters a new character in the search box 214. For example, if the user 10 intends to enter the query term "earthquake," the user 10 may enter the progression e-a-r-t-h-q-u-a-k-e. In this example, the incremental search queries 212 include {"e," "ea," "ear," "cart" "earth," "earthq," "earthqu," "earthqua," "earthquak," and "earthquake,"}. The search system 300 or the search application 216 (on the user device 200) monitors each character entry and determines a set of possible query strings, as well as a probability that the possible query string is the intended string. Drawing from the example above, when the user 10 enters "ear" the query strings "ear" "earth" and "earthquake" are probably going to have higher probability strings than "earwig" or "earwax." The search system 300 or the search application 216 can utilize a TRIE to generate the possible query strings. TRIE, also known as a digital tree, radix tree, or prefix tree, is an ordered tree data structure used to store a dynamic set or associative array. The keys in a TRIE are usually a string. Other methods for generating query strings are possible as well. In other implementations, the incremental search query 212 is only the partial query string entered by the user 10. In these implementations, the search system 300 is queried with the partial query string using a "begins with [string]" command or a "includes [command]" command.

In some examples, each time a user 10 enters a search query 212 in a search field 214 of a user device 200, an incremental search query 212 is generated and the search system 300 attempts to identify personalized search results 220 that the user 10 is looking for. The personalized search results 220 are based on an incremental search query 212, application search records 330, user data store 360 (e.g., one or more user profile records 370), and in some cases, context parameters, such as parameters included in a query wrapper 210.

Referring back to FIGS. 3A and 3B, the query wrapper 210 may include additional data along with the search query 212. For example, the query wrapper 210 may include device location data 218 (e.g., geo-location data) that indicates the location of the user device 200, such as latitude and longitude coordinates. The user device 200 may include a global positioning system (GPS) receiver that generates the geo-location data 218 transmitted in the query wrapper 210. The query wrapper 210 may also include an IP address 228, which the search module 310 may use to determine the location of the user device 200. In some examples, the query wrapper 210 also includes additional data, including, but not limited to, platform data 222 (e.g., version of the operating system 224, device type, and web-browser version), an identity of a user 10 of the user device 200 (e.g., a username), partner specific data, and other data. In some examples, the query wrapper 210 includes installed application data 229 that includes applications 204 installed on the user device 200. In some examples, the query wrapper 210 includes information that the profile generation module 350 used to update the user profile record 370.

In some examples, the search module 310 receives an incremental search query 212 (which may be a set of possible query strings or just the partial query string) and outputs application state identifiers (IDs) 332 (or application state records 330) that point to application states or documents 144 (i.e., RSS documents 144 included in the RSS feeds 142 having near-real time information). Each application state ID 332 uniquely identifies a state of an application 204, and provides a template or the parameters to uniquely identify one or more access mechanisms accessing a state of an application (e.g., different OS may use different access mechanisms to assess a state of an application). In some implementations, the application state Ms 332 include a Uniform Resource Locator (URL) referencing a functional state of an application 204. In other implementations, the application state IDs may include another locator having a different form, e.g., func://exampleapp/param1¶m2, which includes the parameters (param1 and param2) that are used to generate the access mechanisms 202.

In some implementations, the search module 310 or the search application 216 filters the personalized search results 220 based on location data (e.g., geo-location data 218) of a user device 200 and a location data 334d of the application state record 330 or feed location data 394d of the document 144 or the content feed 142 associated with a feed record 390. In this way, the system 100 provides personalized search results 220 that are relevant to the user 10. The query wrapper 210 may include geo-location data 218 of the user device 200. Therefore, the system 100 may use the geo-location data 218 of the user device 200 and the location data associated with a search result 220 to filter through the personalized search results 220 and only provide the user 10 with relevant personalized results based on their subscription tags 376 and, for example, the geo-location of the user device 200. Thus, a person in Detroit does not receive personalized results 220 that are relevant to California. For example, if a user 10 in Detroit inputs "fire" in the search field 214 of the user device 200, the user 10 may not be interested in a local fire in Los Angeles, but the user 10 may be interested in an article about a wildfire across southern California. The local fire in Los Angeles would probably be found on a local RSS feed 142, while the wildfire across southern California would be on a national news feed 142. Thus, the system 100 uses geo-location data (e.g., feed geo-location 394d) associated with a feed 142 (e.g., a feed record 390) to provide better search results to the user 10 based on the device's geo-location data 218 and the geo-location data 394d associated with a feed record (see FIG. 5A).

Figure 11:
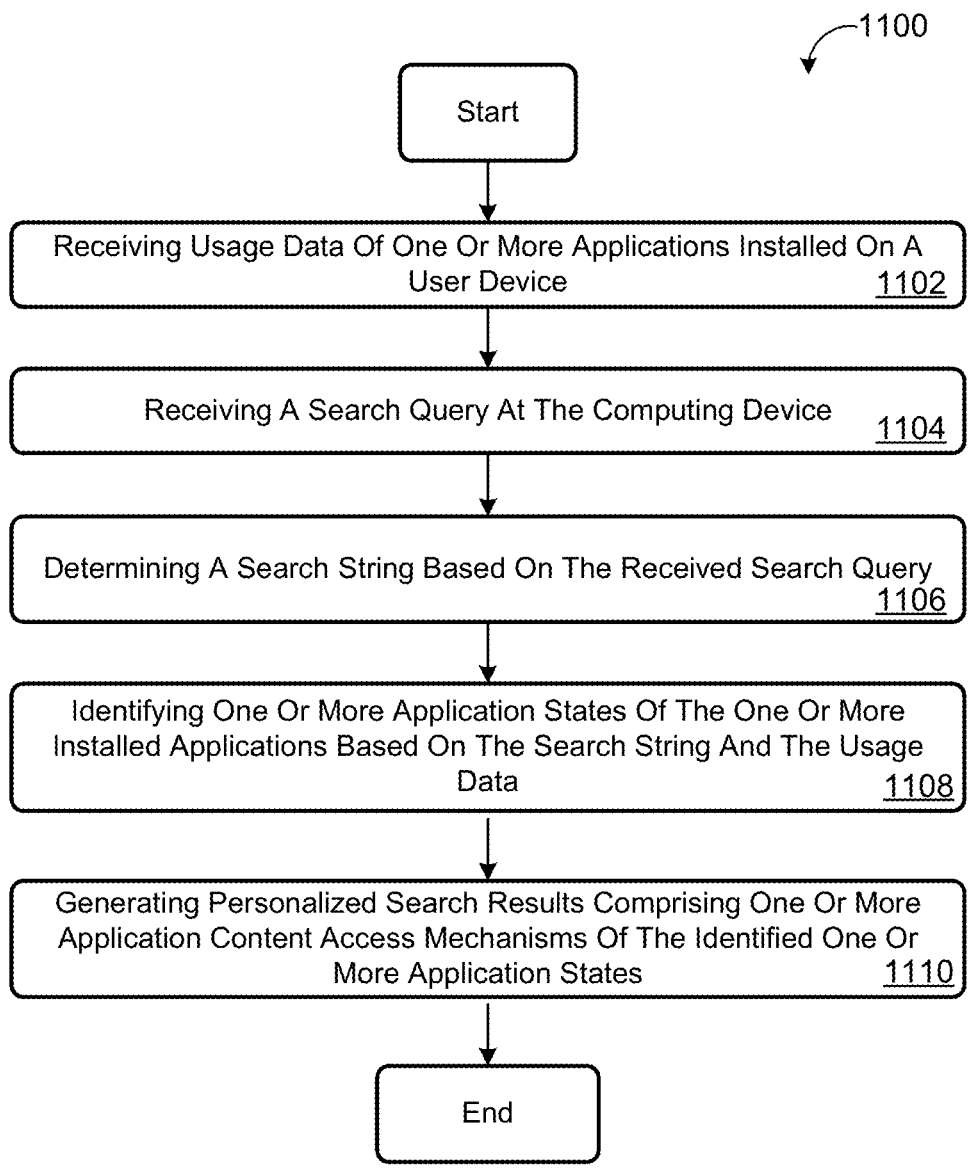
FIG. 11 is a schematic view of an example method for personalizing deep search results using subscription data.

Referring back to FIG. 4A, once the data collection module 380 generates the feed record 390, the data collection module 380 periodically checks the content feed 142 for any new data or content documents 144 (e.g., every few minutes, hours, or days). The data collection module 380 periodically checks the content documents 144 for updated information of each content feed 142 it is subscribed to. When the data collection module 380 detects new content or feed documents 144, the data collection module 380 crawls the new content (e.g., a new article) to identify data, such as the title, keywords, any access mechanisms 202 that are used (at the very least the data collection module 380 can identify the URL from which the content was obtained). If the content or documents 144 being crawled does not include application resource identifiers embedded therein, the data collection module 380 can generate application resource identifiers based on the web resource identifiers and the access mechanism data defined in the feed record. For example, if the article is referenced by a number in the web URL (e.g., " . . . /article=1234") and the template for generating application access mechanisms includes an article number field, the data collection module 380 can generate the application access mechanism by substituting the article number found in the web URL into the template. The data collection module 380 generates an application state record based on the newly crawled content and the identified or generated access mechanisms 202 (FIG. 11). The data collection module 380 then updates the search data store 320 with the new application state records 330.

In some implementations, the data collection module 380 also generates application state records 330 for applications that do not have content feeds 142. In these implementations, the data collection module 380 generates an application state ID 332 configured to generate one or more access mechanisms 202 for accessing the "other application." First, the system 100 determines which applications 204 the system 100 should generate the application state records 330 for. For example, the system 100 can associate TWITTER® or FLIPBOARD® to CNN®, NY Times, FOX NEWS®, etc., thereby indicating that when the system 100 finds new content or documents 144 on CNN® or NY Times then the system 100 may also generate application state records 330 for TWITTER® or FLIPBOARD®. In some examples, the system 100 uses a lookup table (not shown) to identify other applications (not initially identified) or the system 100 may include the other applications hard coded into the feed record 390. The system 100 (i.e., the data collection module 380) can then obtain access mechanism data 394c for the other application and generate an application state ID 332 and/or access mechanisms 202 (application resource identifier or script) based on the content or documents 144 of the crawled application. For example, the system can insert the title of the application into a template for generating access mechanisms 202 for the other application (see TWITTER® example above). The data collection module 380 can then generate an application state record 330 using the generated application state ID 332 and/or access mechanism 202. The data collection module 380 can utilize some of the keywords extracted from the crawled content or documents 144 to populate the keywords of the new application state record 330.

With continued reference to FIGS. 4-5D, the search module 310 receives a query wrapper 210 and generates personalized search results 220 based on data included in a storage system 304 that includes a search data store 320 and a user data store 360. In some implementations, the search system 300 receives a query wrapper 210 from the user device 200 and performs a search for feed records 390 and/or application state records 330 in the storage system 304 based on data included in the query wrapper 210, such as a search query 212. The feed records 390 include one or more access mechanisms 202 that the user device 200 can use to access a content feed 142, while the application state records 330 include one or more access mechanisms 202 that the user device 200 can use to access documents 144 of the content feed 142. The search module 310 transmits search results 220 including a list of access mechanisms 202 to documents 144 of a content feed 142 to the user device 200 that generated the query wrapper 210.

The user device 200 generates user selectable links 234, 236 associated with each displayed search result 230 based on the received search results 220 (e.g., links 234, 236 of FIG. 1). Each user selectable link 234, 236 displayed to the user 10 may include an access mechanism 202. An application link 236 allows the user 10 to access the application 204, while a content link 234 allows the user 10 to access the document 144 associated with the displayed text (i.e., link 234), using the application 204 associated with the application link 236. In some examples, the search result 230 includes an Open button link that allows the user 10 to access the application 204. The Open button link may allow the user 10 to access the document 144 associated with the content link 234. The user 10 may select a user selectable link 234, 236 on the user device 200 by interacting with the link 234, 236 (e.g., touching or clicking the link 234, 236) corresponding to a search result 230. In response to selection of the link 234, 236, the user device 200 may launch a corresponding software application 204 (e.g., a native application 204a or a web-browser application 204b) referenced by the access mechanism 202 and perform one or more operations indicated in the access mechanism 202 of the application link 236 or the content link 234.

Access mechanisms 202 may include at least one of a native application access mechanism 202a (hereinafter "application access mechanism"), a web access mechanism 202b, and an application download mechanism 202c. The user device 200 may use the access mechanisms 202 to access functionality of applications 204. For example, the user 10 may select a user selectable link 234, 236 including an access mechanism 202 in order to access functionality of an application 204 indicated in the user selectable link 234, 236. The search module 310 may transmit one or more application access mechanisms 202a, one or more web access mechanisms 202b, and one or more application download mechanisms 202c to the user device 200 in the search results 220.

An application access mechanism 202a may be a string that includes a reference to a native application 204a and indicates one or more operations for the user device 200 to perform. If a user 10 selects a user selectable link 234, 236 including an application access mechanism 202a, the user device 200 may launch the native application 204a referenced in the application access mechanism 202a and perform the one or more operations indicated in the application access mechanism 202a.

An application access mechanism 202a includes data that the user device 200 can use to access functionality provided by a native application 204a. For example, an application access mechanism 202a can include data that causes the user device 200 to launch a native application 204a and perform a function associated with the native application 204a. Performance of a function according to the access mechanism 202 may set the native application 204a into a specified state. Accordingly, the process of launching a native application 204a and performing a function according to an application access mechanism 202a may be referred to herein as launching the native application 204a and setting the native application 204a into a state that is specified by the application access mechanism 202a. In some examples, an application access mechanism 202a for a restaurant reservation application can include data that causes the user device 200 to launch the restaurant reservation application and assist in making a reservation at a restaurant. In such examples, the restaurant reservation application may be set in a state that displays reservation information to the user 10, such as a reservation time, a description of the restaurant, and user reviews. In additional examples, an application access mechanism 202a for an internet media player application can include data that causes the user device 200 to launch the internet media player application and stream media from the Internet. In such examples, the internet media player application may be set in a state that displays information regarding the media (e.g., music) being streamed, such as a song name, an artist, or an album name.

Application access mechanisms 202a may have various different formats and content. The format and content of an application access mechanism 202a may depend on the native application 204a with which the application access mechanism 202 is associated and the operations that are to be performed by the native application 204a in response to selection of the application access mechanism 202a. For example, an application access mechanism 202a for an internet music player application may differ from an application access mechanism 202a for a shopping application. An application access mechanism 202a for an internet music player application may include references to musical artists, songs, and albums, for example. The application access mechanism 202a for an internet music player application may also reference operations, such as randomizing a list of songs and playing a song or album. An application access mechanism 202a for a shopping application may include references to different products that are for sale. The application access mechanism 202a for the shopping application may also include references to one or more operations, such as adding products to a shopping cart and proceeding to a checkout.

Figure 6:
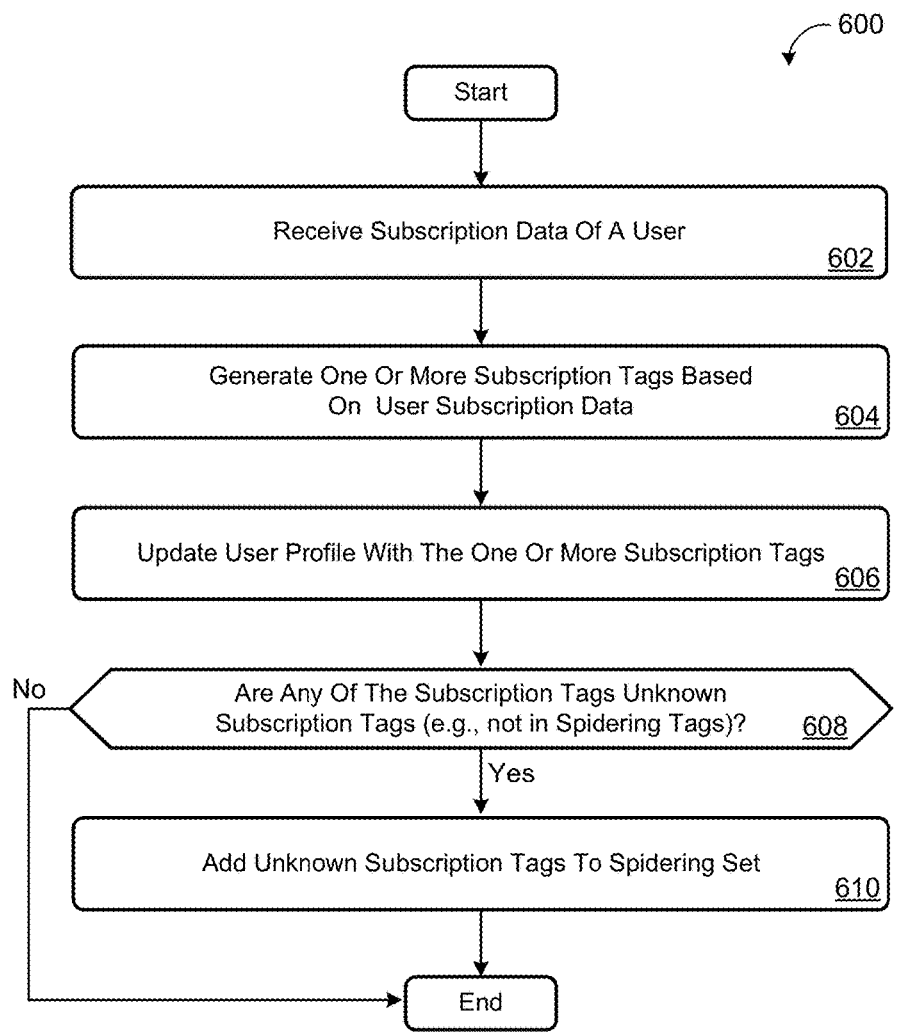
FIG. 6 is a schematic view illustrating an example method for generating a user profile.

FIG. 6 illustrates an example method 600 for receiving subscription data from a user device 200 and determining if the subscription tags 376 of a generated user profile record 370 are known subscription tags 376a or unknown subscription tags 376b. At block 602, the search system 300 (FIG. 3) receives subscription data of a user 10 from a user device 200. At block 604, the search system 300 (i.e., data collection module 380) generates one or more subscription tags 376 based on the received subscription data from the user device 200. At block 606, the collection module 380 updates a user profile, i.e., profile record 370, with the one or more received subscription tags 376. At block 608, the collection module 380 determines if any of the subscription tags 376 are unknown subscription tags 376b. If there are unknown subscription tags 376b, then, at block 610, the collection module 380 adds the unknown subscription tags 376b to a set of 'spidering tags' that the collection module 380 may crawl and spider the web to collect data for.

Figure 7:
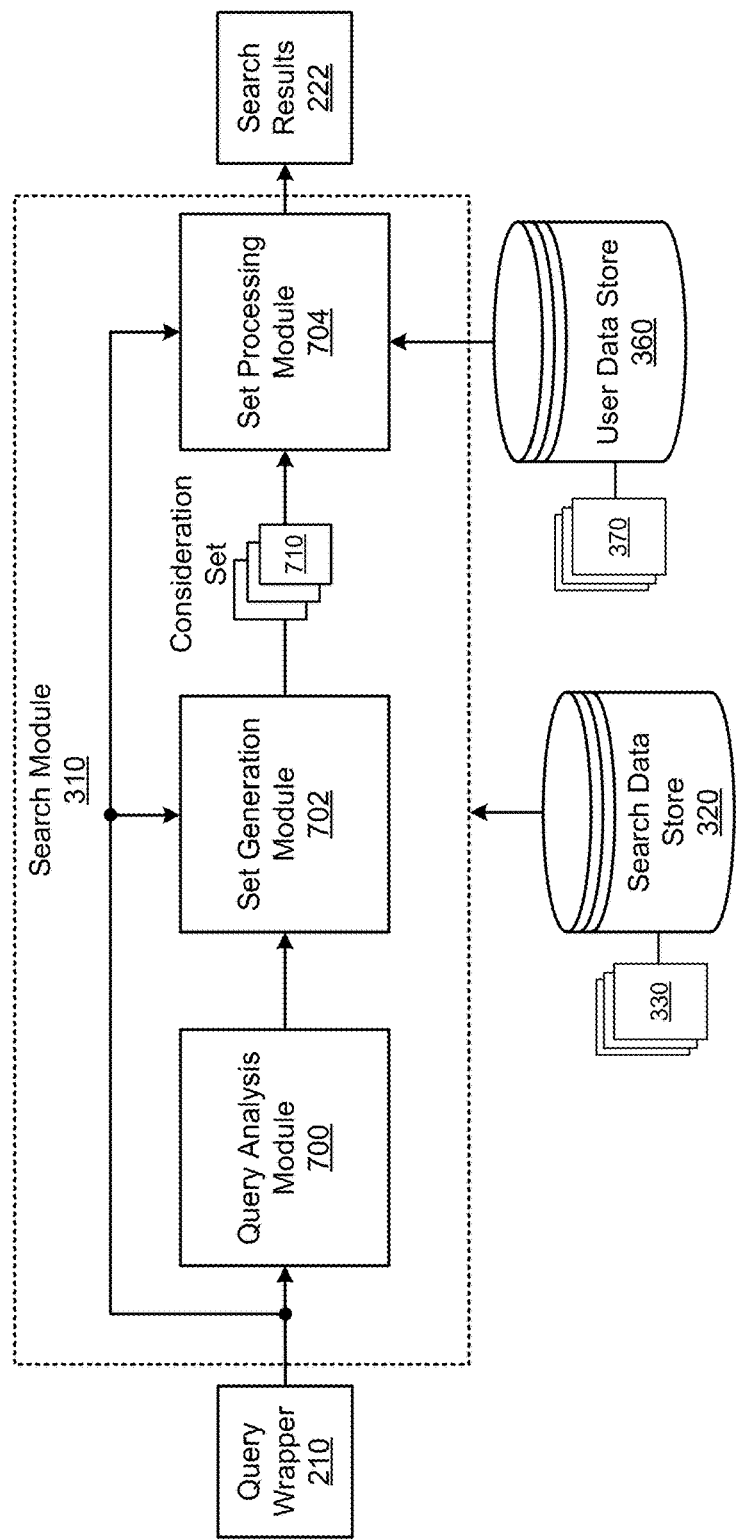
FIG. 7 is a functional block diagram of a search module.

FIG. 7 shows an example search module 310 that includes a query analysis module 700, a consideration set generation module 702 (hereinafter "set generation module 702"), and a consideration set processing module 704 (hereinafter "set processing module 704"). The query analysis module 700 receives the query wrapper 210 and analyzes the received search query 212. The query analysis module 700 may perform various analysis operations on the received search query 212, which may include, but are not limited to, tokenization of the search query 212, filtering of the search query 212, stemming, synonymization, and stop word removal. In some implementations, the query analysis module 700 detects a query-specified location included in the search query 212.

The set generation module 702 identifies a plurality of application state records 330 based on the received search query 212. In some examples, the set generation module 702 identifies the application state records 330 based on matches between terms of the search query 212 and terms in the application state records 330. For example, the set generation module 702 may identify the application state records 330 based on matches between tokens generated by the query analysis module 700 and words included in the application state records 330, such as words included in the application state IDs 332 and/or the application state information 334.

The consideration set 710 of application state records 330 may refer to the application state records 330 that are to be scored by the set processing module 704. The set generation module 702 may determine the geo-location of the user device 200 based on data included in the query wrapper 210 (e.g., geo-location data 218). In additional examples, if the query analysis module 700 detects a query-specified location, the set generation module 702 uses the query-specified location as the search location. For example, the user 10 may specify a location, such as a city in the inputted search query 212, such as "Detroit Baseball." In some examples, the set generation module 702 uses the geo-location of the user device 200 (e.g., geo-location data 218) as the search location (e.g., to filter application state records 330 based on location).

The set processing module 704 may score the application state records 330 in the consideration set 710 in order to generate a set of personalized search results 220. The result scores 226 associated with the application state records 330 may be referred to as "result scores." The set processing module 704 may determine a result score 226 for each of the application state records 330 in the consideration set 710. The result scores 226 associated with an application state record 330 may indicate the relative rank of the application state record 330 (e.g., by the access mechanisms 202) among other application state records 330. For example, a larger result score 226 may indicate that an application state record 330 is more relevant to the received search query 212.

The set processing module 704 selects application access mechanisms 202 from the selected application state records 330 (e.g., the highest scoring function records). The set processing module 704 transmits the selected application access mechanisms 202 to the user device 200 that generated the search query 212. The set processing module 704 may also transmit the result scores 226 associated with the selected application access mechanisms 202. For example, an application access mechanism 202 may be associated with the result score 226 of the application state record 330 from which the application access mechanism 202 was selected.

The set processing module 704 is in communication with the user data store 360. Thus, the search module 310 utilizes the user's subscription data, such as the subscription tags 376 of the user profile record 370, to increase the relevance of the personalized search results 220. In operation, a search module 310 receives a search query 212 and identifies a consideration set 710 of records 330. The set processing module 704 utilizes the subscription data 376 at a result processing phase. Therefore, when the consideration set 710 is identified, the set processing module 704 scores each record identified in the consideration set 710.

The information conveyed by the personalized search results 220 may depend on how the result scores 226 are calculated by the set processing module 704. For example, the result scores 226 may indicate the relevance of an application function or application state to the search query 212, the popularity of an application function or state, or other properties of the application function or state, depending on what parameters the set processing module 704 uses to score the application state records 330.

The set processing module 704 may generate result scores 226 for application state records 330 in a variety of different ways. In some implementations, the set processing module 704 generates a result score 226 for an application state record 330 based on one or more scoring features. The scoring features may be associated with the application state record 330 and/or the search query 212. A function record scoring feature (hereinafter "record scoring feature") may be based on any data associated with an application state record 330. For example, record scoring features may be based on any data included in the application state information 334 of the application state record 330. Example record scoring features may be based on metrics associated with a person, place, or thing described in the application state record 330. Example metrics may include the popularity of a place described in the application state record 330 and/or ratings e.g., user ratings) of the place described in the application state record 330. For example, if the application state record 330 describes a song, a metric may be based on the popularity of the song described in the application state record 330 and/or ratings (e.g., user ratings) of the song described in the application state record 330. The record scoring features may also be based on measurements associated with the application state record 330, such as how often the application state record 330 is retrieved during a search and how often access mechanisms 202 of the application state record 330 are selected by a user 10. Record scoring features may also be based on whether the application state record 330 includes an application access mechanism 202 that leads to a default state or a deeper native application state.

A query scoring feature may include any data associated with the search query 212. For example, query scoring features may include, but are not limited to, a number of words in the search query 212, the popularity of the search query 212, and the expected frequency of the words in the search query 212. A record-query scoring feature may include any data generated based on data associated with both the application state record 330 and the search query 212 that resulted in identification of the application state record 330 by the set generation module 702. For example, record-query scoring features may include, but are not limited to, parameters that indicate how well the terms of the search query 212 match the terms of the application state information 334 of the identified application state record 330. The set processing module 704 may generate a result score 226 for an application state record 330 based on at least one of the record scoring features, the query scoring features, and the record-query scoring features.

The set processing module 704 may determine a result score 226 for an application state record 330 based on one or more of the scoring features listed herein and/or additional scoring features not explicitly listed. In some examples, the set processing module 704 includes one or more machine learned models (e.g., a supervised learning model) configured to receive one or more scoring features. The one or more machine learned models may generate result scores 226 based on at least one of the record scoring features, the query scoring features, and the record-query scoring features. For example, the set processing module 704 may pair the search query 212 with each application state record 330 and calculate a vector of features for each (query, record) pair. The vector of features may include one or more record scoring features, one or more query scoring features, and one or more record-query scoring features. The set processing module 704 may then input the vector of features into a machine-learned regression model to calculate a result score for the application state record 330. In some examples, the machine-learned regression model includes a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels. In some of the examples that utilize machine learned scoring, the subscription tags 376 are fed into the scoring model with the other scoring features (e.g., record features, query features, and/or record-query features). These features may be referred to as "user features." User features can include features that are defined in the user profile record 370, including, but not limited to the subscription tags 376 associated with the user 10. The user features can include other features, such as an age, a home location, and device type of the user 10. In these implementations, applications state records 330 that are tagged with subscription tags 376 may result with higher scores if the user 10 subscribes to a content feed 142 corresponding to the subscription tag 376. For example, the scoring model may learn that users 10 are more likely to respond to (e.g. click on) search results 220 that identify states of application to which the user 10 is subscribed. In other implementations, the result scores of an application record 330 are calculated. After the result scores are calculated, the set processing module 704 may boost a score of the application record 330 if the state defined in the application record 330 was obtained from a content feed 142 to which the user 10 is subscribed. For example, the set processing module 704 may multiply the result score of an application record 330 by a boosting factor (e.g., 1.2) when the data 144 (e.g., document) defined in the application state record 330 was obtained from a content feed 142 to which the user 10 is subscribed.

The result scores 226 associated with the application state records 330 (e.g., access mechanisms 202) may be used in a variety of different ways. The set processing module 704 and/or the user device 200 may rank the access mechanisms 202 based on the result scores 226 associated with the access mechanisms 202. In these examples, a larger result score may indicate that the access mechanism 202 (e.g., the function or application state) is more relevant to a user than an access mechanism 202 having a smaller result score. In examples where the user device 200 displays the personalized search results 220 as a list, the user device 200 may display the links 234, 236 for access mechanisms 202 having larger result scores 226 nearer to the top of the results list (e.g., near to the top of the screen). In these examples, the user device 200 may display the links 234, 236 for access mechanisms 202 having lower result scores 226 farther down the list (e.g., off screen). In some examples, as illustrated in FIG. 2, the user device 200 groups together the links 234, 236 associated with the same native application 204a.

Modules and data stores included in the search system 300 represent features that may be included in the search system 300 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein are realized by common electronic hardware and software components. In some implementations, the features associated with the one or more modules and data stores depicted herein are realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

In some implementations, the search system 300 is a system of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the search system 300 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the search system 300 may be configured to communicate with the network 120. The one or more computing devices of the search system 300 may also be configured to communicate with one another (e.g., via a computer network). In some examples, the one or more computing devices of the search system 300 includes one or more server computing devices configured to communicate with user devices (e.g., receive query wrappers and transmit results), gather data from data sources 130, index data, store the data, and store other documents. The one or more computing devices may reside within a single machine at a single geographic location in some examples. In other examples, the one or more computing devices may reside within multiple machines at a single geographic location. In still other examples, the one or more computing devices of the search system 300 may be distributed across a number of geographic locations.

Figure 8:
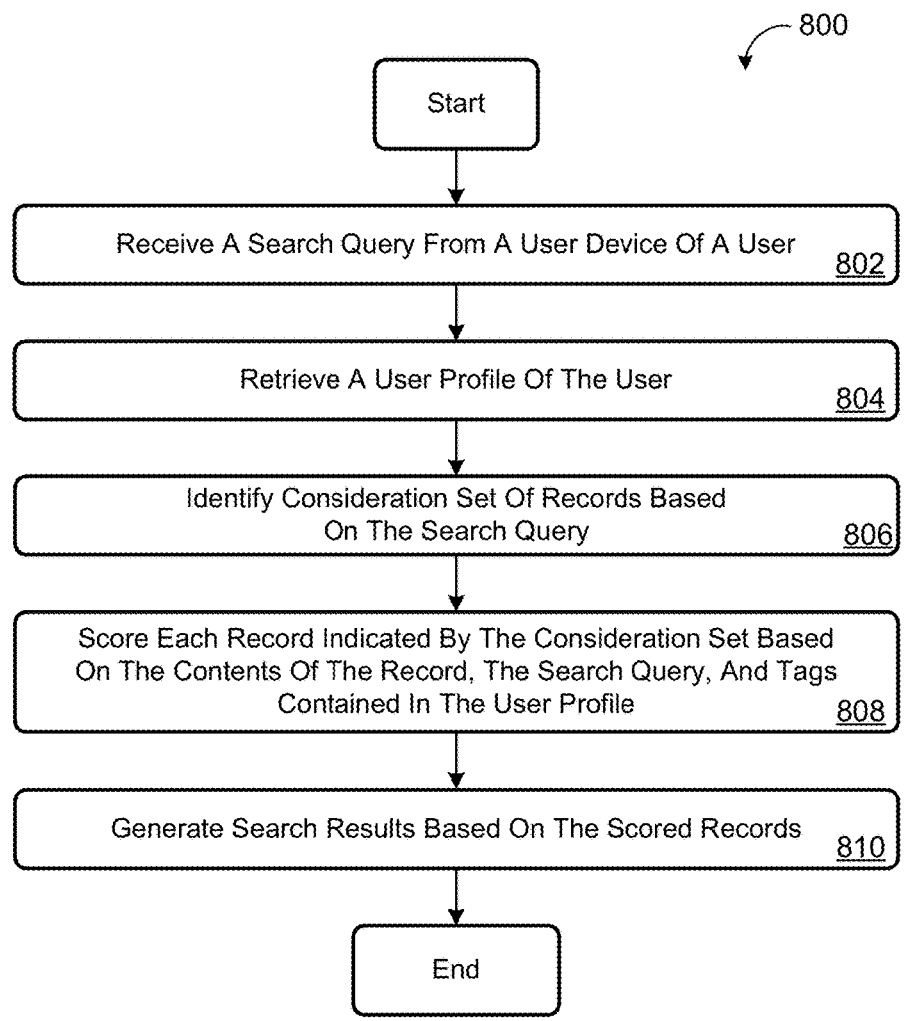
FIG. 8 is a schematic view illustrating an example method for scoring a consideration set using a user generated user profile.

FIG. 8 illustrates an example method 800 for receiving a search query 212 from a user 10 via a user device 200 and generating personalized search results 220 (e.g., displayed search results 230, each including an application link 236 and content link 234) based on the received search query 212 and user profile record 370. At block 802, the search system 300, i.e., the search module 310, receives a search query 212 from a user device 200 of a user 10. The search query 212 may be an incremental search query. At block 804, the search module 310 retrieves a user profile record 370 associated with the user 10 using the user device 200 that transmitted the search query 212. In some examples, each user 10 has more than one user device 200; therefore, the user profile record 370 is associated with the one or more user device(s) 200 of the same user 10. This means that each user profile record 370 is associated with a user 10 regardless of how may devices the user 10 has. At block 804, the search module 310, more specifically the set processing module 704 (FIG. 7), retrieves a user profile record 370 of a user 10 from the user data store 360. A profile generation module 350 (of the search system 300) generates one or more user profile record(s) 370 from one or more user devices 200, upon a permission of the user 10 for the profile generation module 350 to access data on the user device 200. The user profile record 370 previously stored on the user data store 360. At block 806, the set processing module 704 identifies a consideration set 710 of application state records 330 based on the search query 212 received from the user device 200. At block 808, the set processing module 704 scores each application state record 330 indicated by the consideration set 710 based on the contents of the application state record 330, the received search query 212, and the user profile record 370, more specifically the subscription tags 376, associated with the user 10 who sent the search query 212. At block 810, the search module 310 generates the personalized search results 220 based on the scored application state records 330 of the consideration set 710. After generating the search results, the search system 300 sends the search results 220 to the user device 200 from which the query 210, 212 was received. The user device 200 received the search results 220 and generated search results 230 to be displayed on a display of the user device 200. The search results 220 include access mechanisms 202, result scores 226, and link data 232. In some examples, the user device 200 considers the result scores 226 of the search results 220 to determine the order that the displayed search results 230 are shown on the display of the user device 200. Moreover, the user device 200 uses the link data to generate the application links 236 and the content links 234 of each displayed search result 230.

Figure 9:
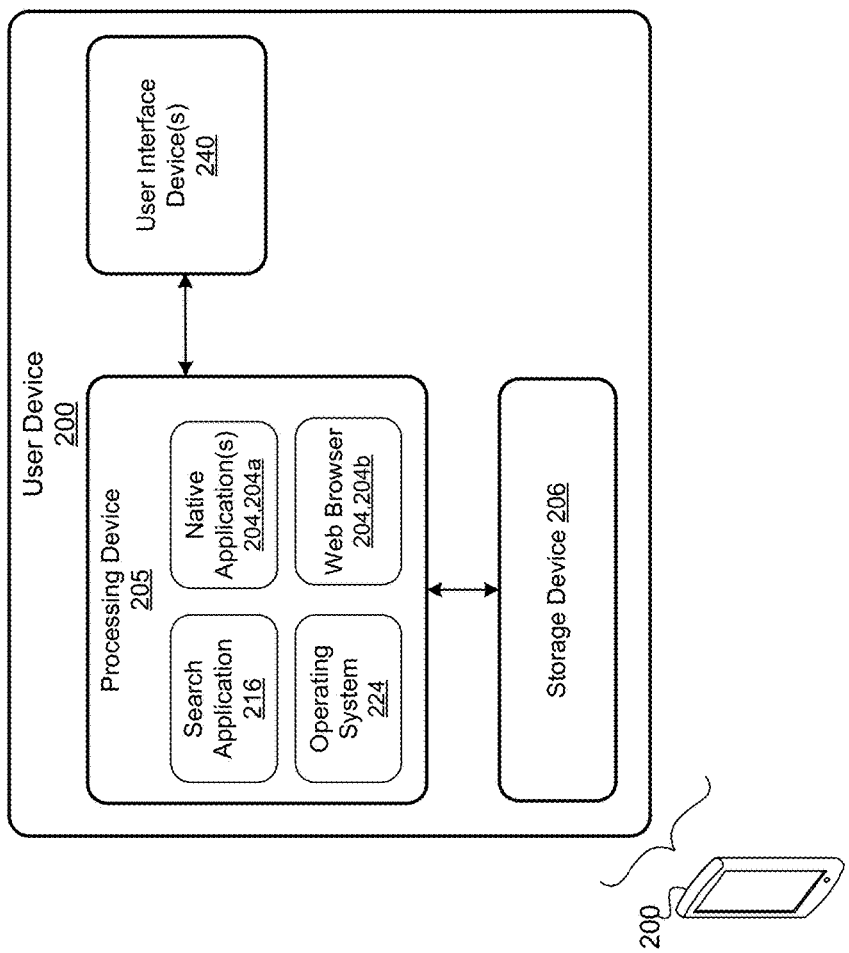
FIG. 9 is a functional block diagram of a user device.
Figure 10C:
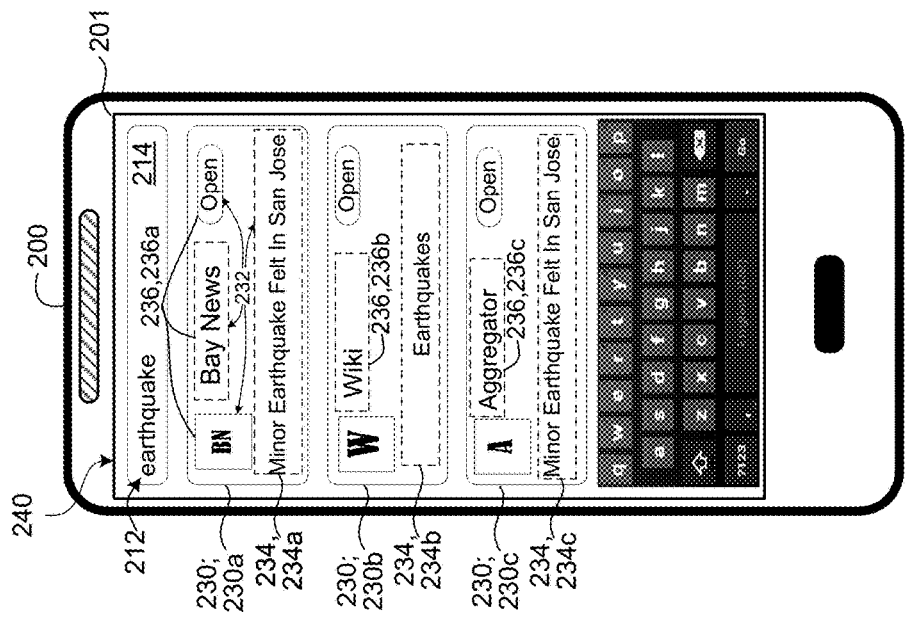

Referring to FIGS. 9-10C, in some examples, the user device 200 includes a processing device 205 (also referred to as a processor) and memory hardware, i.e., storage device 206 in communication with the processor 204. The user device 200 may include a graphical user interface (GUI) 240 of a search application 216 running on the user device 200 (e.g., executing on the processor 204). The GUI 240 displays a list 231 of displayed search results 230 (that includes user-selectable links 234, 236) based on the search query 212 that the user 10 entered into the search field 214. The processing device 205 executes one or more applications, including but not limited to a search application 216, native applications 204, 204a and web browser applications 204, 204b. In addition, the user device 200 may run an operating system 224 while executing one or more applications 204, 216.

The search system 300 may transmit data (e.g., link data 232, such as text and/or images), which may be used by the user device 200 to generate user selectable links 234, 236 from the displayed search results 230. A link 234, 236 may include text and/or images that the user 10 may select (e.g., touch) via a user interface 240 displayed on a screen 201 (e.g., a display or touch screen) of the user device 200. Each user selectable link 234, 236 may be associated with an application access mechanism 202a such that when the user 10 selects a link 234, 236, the user device 200 launches the native application 204a referenced in the application access mechanism 202a and performs the one or more operations indicated in the application access mechanism 202a. The text and/or images of a link 234, 236 displayed to the user 10 may indicate the operations that may be performed in response to selection of the link 234, 236. For example, if the link 234, 236 is to a song in a music playing application, the text and/or images may identify the music application that may be launched by the user device 200 and the song that may be played by the music playing application when the user 10 selects the link 234, 236. Another example, if the link 234 is to a content feed 142, the link 234 may display text associated with a document 144 associated with the content feed 142, and the link 234 may launch an application 204 that allows the user 10 to view the document 144.

The user 10 may select a link 234, 236 to cause the user device 200 to launch the native application 204a identified in the link 234, 236 and perform one or more operations according to the application access mechanism 202a associated with the link 234, 236. Put another way, when the user 10 selects a link 234, 236, the user device 200 launches a native application 204a and sets the native application 204a into astute defined by the application access mechanism 202a associated with the link 234, 236. In general, a state of a native application 204a may refer to the operations and/or the resulting outcome of the native application 204a in response to selection of a link 234, 236. A state to which the native application is set may also be referred to herein as an "application state." Therefore, if the user 10 the application link 236, the GUI 240 may display the homepage associated with the application 204; while if the user 10 selects the content link 234, then the GUI 240 displays the data or document 144 associated with the application or content link 234.

An application state specified by an application access mechanism 202a may depend on the functionality provided by the native application 204a. For example, if a native application 204a is configured to retrieve and display information from the Internet, the native application 204a can be set into a state in which the native application 204a retrieves information from the Internet and displays information to the user 10. In another example, if a native application 204a is configured to play media (e.g., music and/or video) from the Internet, the native application 204a can be set into a state in which the native application 204a is playing a song or a movie from the Internet. In another example, if a native application 204a is configured to make restaurant reservations, the native application 204a can be set into a state in which the native application 204a displays available restaurant reservations to the user 10.

A web access mechanism 202b may include a resource identifier that includes a reference to a web resource (e.g., a page of a web application/website). For example, a web access mechanism 202b may include a uniform resource locator (URL) (i.e., a web address) used with hypertext transfer protocol (HTTP). If a user 10 selects a user selectable link 234, 236 including a web access mechanism 202b, the user device 200 may launch the web browser application 204b and retrieve the web resource indicated in the resource identifier. Put another way, if a user 10 selects a user selectable link 234, 236 including a web access mechanism 202b, the user device 200 may launch a corresponding web-browser application 204b and access a state (e.g., a page) of a web application/website. In some examples, web access mechanisms 202b include URLs for mobile-optimized sites and/or full sites.

The web access mechanism 202b included in an application state record 330 may be used by a web browser to access a web resource that includes similar information and/or performs similar functions as would be performed by a native application 204a that receives an application access mechanism 202a of the application state record 330. For example, the web access mechanism 202b of an application state record 330 may direct the web-browser application 204b of the user device 200 to a web version of the native application 204a referenced in the application access mechanisms 202a of the application state record 330. Moreover, if the application access mechanisms 202 included in an application state record 330 for a specific Mexican restaurant cause each application edition to retrieve information for the specific Mexican restaurant, the web access mechanism 202b may direct the web-browser application 204b of the user device 200 to a web page entry for the specific Mexican restaurant.

An application download mechanism 202c may indicate a location (e.g., a digital distribution platform 130b) where a native application 204a can be downloaded in the scenario where the native application 204a is not installed on the user device 200. If a user 10 selects a user selectable link 234, 236 including an application download mechanism 202a, the user device 200 may access a digital distribution platform from which the referenced native application 204a may be downloaded. The user device 200 may access a digital distribution platform 130b using at least one of the web-browser application 204b and one of the native applications 204a.

FIGS. 10A-10C illustrate the different types of the search results 220 that may be presented to different users 10 based on the native applications 204a that each user has installed on his/her user device 200. For example, and referring to FIG. 10A, the user 10 may have two sports news applications 204 (e.g., Sports News A and Sports News B) and a News application (e.g., "Bay News") installed on the user device 200. When the user 10 enters the query string "ear" into the search box 214, the displayed list 231 of search results 230 includes displayed results 230, 230a-c, where each displayed result 230 includes first and second user selectable links 234, 236. The search system 300 considers the user profile 370, including the user subscriptions tags 376. Assuming that the user profile 370 indicates that the user 10 is located in the San Jose area, the search system 300 provides search results 220 (i.e., displayed results 230) relating to the 'San Jose Earthquakes' due to the association of the user location and the applications downloaded on the user device 200. Thus, the displayed search results include a first user-selectable link 236 that allows the user 10 to open the application 204 associated with the search result; while a second user-selectable link 234 provides the user 10 with a link to a document 144 related to the application 204 associated with the search result 230 and related to the entered search query 212. As shown in the example, the first displayed result 230a provides a first application link 236a to the 'Sports News A' application and a second content link 234a that provides the user 10 with a link to an article about the San Jose Earthquakes. The second displayed result 230b includes a first application link 236b to the 'Sports News B' application, and a second content link 234b that provides the user 110 with a score of an on-going San Jose Earthquakes game. The third displayed result 230c includes a first application link 236c to the 'Bay News' application, and a second content link 234c that provides the user 10 with an article in the Bay News about the Earthquakes team (in this case that the Earthquakes team is trading a starting player). The second user-selectable links 234 are associated with applications previously installed on the user device 200. In other words, the search may be restricted to searching content feeds 142 (e.g., documents 144) associated with applications 204 previously installed on the user device 200.

Another example is shown in FIG. 10B where the user 10 has a BookReader application 204 and a news application 204 installed on the user device 200. The system 100 may have previously collected content feeds (e.g., feed documents 144) from the BookReader application that are for a new book called "Earthlings 2" and a review of "Earthlings 2" and the system 100 may have collected from the Bay News application an article (e.g., a document 144) about the Earthquakes soccer team in San Jose, in this example, the displayed search results 230, in response to the search query "ear," include, and as shown, three search results. A first displayed search result 230a includes a first application link 236a to the BookReader application, while a second content link 234a provides the user with a link to download a copy of Earthlings 2. The second displayed search result 230b includes a first application link 236a to the BookReader application 204, and a second content link 234b provides the user 10 with a link to read a review of Earthlings 2 on BookReader. The third displayed result 230c includes a first application link 236c to the 'Bay News' application, and a second content link 234c that provides the user 10 with an article in the Bay News about the Earthquakes team (in this case that the Earthquakes team is trading a starting player).

In the example illustrated in FIG. 10C, the user may have the Bay News application, a Wiki application, and an Aggregator application (which aggregates syndicated web content, such as online newspaper, blogs, podcasts and video blogs) installed on the user device 200. In this example, only the Bay News application 204 has a content feed 142 (e.g., RSS feed). However, the system 100 determines that the Wiki application is an online encyclopedia resource that allows users 10 to create and collaboratively edit web pages via web browsers and that the Aggregator application is a news aggregator or social media aggregator (e.g., FLIPBOARD® or TWITTER®). Thus, the system 100 may be fairly confident that if it accesses (e.g., using the data collection module 380) the Wiki application and the Aggregator application, the system 100 may be able to retrieve relevant information or results that relate to the term "earthquake" (this may be done at data collection time using the data collection module 380, not at query time, as is previously discussed). During data collection (via the data collection module 380), the system 100 stores additional application state records 330 for the Wiki application, whereby the application state ID 332 and/or access mechanisms 202 defines a deep link into the Wiki application (see FIGS. 5C and 5D). For example, the system 100 may crawl the Bay News article on the "Minor Earthquake Felt in San Jose" to identify the topic as "earthquake." In such a scenario, the system 100 may identify an application state record 330 that defines a Wiki application article on earthquakes. In this example, the displayed search results 230, in response to the search query "earquake" include, and as shown, three search results 230. A first displayed search result 230a includes a first application link 236a to the 'Bay News' application, and a second content link 234a that provides the user 10 with an article in the Bay News about the "Minor Earthquake Felt in San Jose". A second displayed result 230b may include a first application link 236b to the Wiki application and a second content link 234b to an article on earthquakes, where the link may be an application state record 330 defining the Wiki application article on earthquakes. The third search result 230c includes a first application link 236c to the Aggregator application and a second content ink 234c that provides the user 10 with an article in the Bay News about the "Minor Earthquake Felt in San Jose."

Referring to FIGS. 10A-10C, the user 10 entered "ear" or "earthquake" as a search query 212 and the displayed search results 230 were different for each example due to the different applications 204 installed on the user device 200 associated with each example. Therefore, and as shown, the personalized displayed search results 230 are based on several factors including the applications 204 installed on a user device 200, the user profile 370 (e.g., the user profile record) associated with the user device 200 that includes the subscription tags 376, and other information relevant to the user 10.

In yet another example, the system 100 may want to link to an application 204 that aggregates data from many sources (e.g., TWITTER®). In such a scenario, the system 100 may generate an application state ID 332 and/or access mechanism 202 that leverages the search function of the aggregation application 204. For example, if the system 100 learns of a new news article entitled "Cohen: Why We Haven't Stopped Ebola Yet" from crawling the CNN® BSS feed 142, the system 100 can generate an application state ID 332 and/or one or more access mechanisms 202 that access the aggregator application using the title of the article (or document 144). For example, the system 100 can generate the following access mechanisms 202 to access the TWITTER® search function:

https://twitter.com/search?q=Cohen%3A%20Why%20we%20haven%27t%stopped%20Ebola&src=typd
twitter:://search?q=Cohen%3A%20Why%20we%20haven%27t%20stopped%20Ebola&src=typd
or the system 100 can generate an application state ID 332:
func::twitter:
search?q=Cohen%3A%20Why%20we%20haven%27t%20stopped%20Ebola&src=typd In the foregoing examples, the system 100 can generate application state records 330 for the TWITTER® application using the generated application state ID 332 and/or the access mechanisms 202 and the system 100 can populate the application state records 330 with information learned from the originally crawled CNN® article (e.g., with keywords). Thus, when the user 10 enters the search query 212 "ebol," he/she is presented with a link 234 to the TWITTER® application that is relevant to the search query 212, allowing the user 10 to find tweets about this article on TWITTER® as well as see what other people are saying about the article. In this way, the auto suggested search results 220 may provide displayed results 230 having links 234, 236 to resources that have not been crawled, but where the system 100 is confident that the user 10 is directed to a relevant resource.

FIG. 11 illustrates a method 1100 for personalizing deep search results 220 using subscription data 376 (e.g., subscription tags). At block 1102, the method 1100 includes receiving, at a computing device (e.g., a search system 100), usage data (e.g., subscription tags 376) of one or more applications 204 installed on a user device 200. The search system 300 may include a processing system 302 and a storage system 304. The processing system 302 includes a search module 310, a profile generation module 350, and a data collection module 380. In some examples, the profile generation module 350 and the data collection module 380 are standalone modules separate from the search system 300 and in communication with the search system 300 via a network 120. The storage system 304 includes a search data store 320 that stores application state records 330 and a user data store 360 for storing profile records 370. In some examples, the user data store 360 is a standalone data store in communication with the search system 300 via the network 120. At block 1104, the method 1100 includes receiving a search query 212 or a query wrapper 210 from the user device 200 at the computing device. The query wrapper 210 may include the search query 212, geo-location data 218 of the user device 200, platform data 222 of the user device 200, an IP address 228, and subscription data 376 of the user 10. At block 1106, the method 1100 includes determining, by the computing device, a search string based on the received search query 212 or query wrapper 210. At block 1108, the method 1100 further includes identifying, by the computing device, one or more application states of the one or more installed applications 204 based on the search string 212 and the usage data (e.g., subscription tags 376) received from the user device 200. At block 1110, the method 1100 includes generating, by the computing device, personalized search results 220 including one or more content application access mechanisms 202 of the identified one or more application states. Each content application access mechanism 202 has a reference to a corresponding installed application 204 on the user device 200 and indicates a performable operation for the corresponding installed application 204.

In some implementations, the method 1100 includes generating, at the computing device a user profile or user profile record 370 associated with the user device 200. The user profile or user profile record 370 includes user profile data including device data defining at least one of a device location 374*b*, a device operating system 374*c*, or a list of applications installed 374*d* on the user device 200. The user profile or user profile record 370 further includes subscription tags 376 defining one or more user subscriptions to content access mechanisms 202. The method 1100 may include associating a score with each personalized search result 220 based on a relevancy of each search result 220 with the query string and the subscription tags 376 of the user profile or user profile record 370. The relevancy may be based on at least one of the subscription tags 376 of the user 10, an age of the user 10, a home location, or a user device type. Each subscription tag 376 may identify a corresponding installed application 204 on the user device 200 and an associated content feed 142 of the installed application 204.

In some examples, for each subscription tag 376, the method 1100 includes determining whether contents of the subscription tag 376 were previously crawled and have an associated feed record 390. When the contents of the subscription tag 376 have not been crawled, the method 1100 includes crawling the contents of the subscription tag 376 and generating a feed record 390 based on the crawling of the contents of the subscription tag 376. The content feed 142 may be accessible through a corresponding feed access mechanism 202 having a reference to one of the one or more installed applications 204 on the user device 10.

In some implementations, each personalized search result 220 includes a content access mechanism 202 having a reference to a corresponding installed application 204 on the user device 200 and indicating a content performable operation for the corresponding installed application 204. An application access mechanism 202 may have a reference to the corresponding installed application 204 on the user device 200 and indicate a general performable operation for the corresponding installed application 204. The general performable operation is different from the content performable operation, wherein the content access mechanism 202 is associated with the subscription tags 376, and the content access mechanism 202 is different than the application access mechanism 202. Additionally or alternatively, the search result 220 may further include a content user selectable link 234 associated with the content access mechanism 202 and an application user selectable link 236 associated with the application access mechanism 202. The method 1100 may further include receiving, from the user device 200, an indication of a user selectable link 234, 236 and executing the access mechanism 202 associated with the user selectable link 234, 236.

Figure 12:
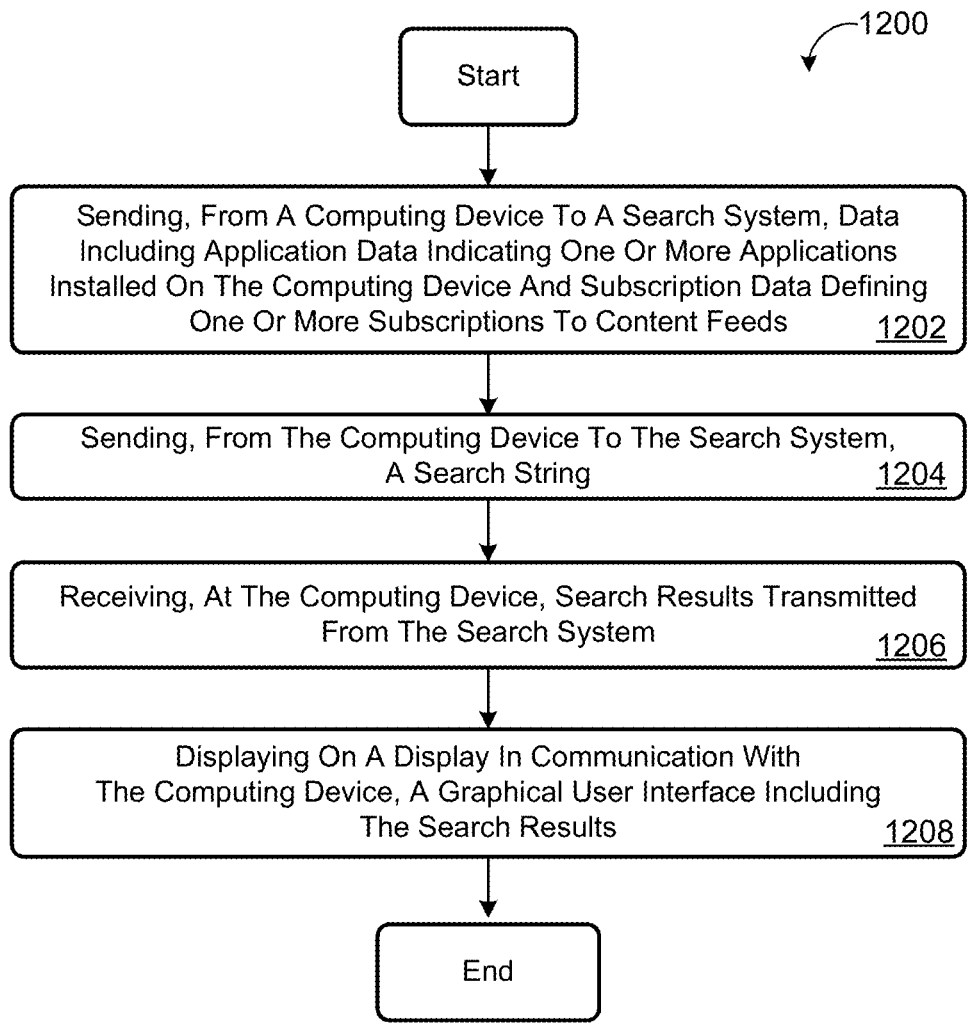
FIG. 12 is schematic view of an example method for sending a search query and receiving personalized deep search results using subscription data

FIG. 12 illustrates a second method 1200 for receiving personalizing deep search results 220 using subscription data 376. At block 1202, the method 1200 includes sending, from a computing device (e.g., a user device 200) to a search system 300 in communication with the computing device, data including application data 229 indicating one or more applications 204 installed on the computing device and subscription data 376 defining one or more subscriptions to content feeds 142. Each subscription 230 is associated with an application 204 installed on the computing device. At block 1204, the method 1200 further includes sending, from the computing device to the search system 300, a search string 212. At block 1206, the method 1200 includes receiving, at the computing device, search results 220 transmitted from the search system 300. Each search result 220 includes a content access mechanism 202 having a reference to a corresponding application 204 that is installed on the computing device and associated with the usage data. The content access mechanism 202 indicates a content performable operation for the corresponding application 204 based on the usage data. At block 1208, the method 1200 further includes displaying, on a display in communication with the computing device, a graphical user interface 240 including the displayed search results 230 (generated based on the search results 220), each displayed search result 230 including a content user selectable link 234 associated with the corresponding content access mechanism 202.

In some implementations, the method 1200 includes receiving, at the computing device, an indication to execute the content access mechanism 202 and executing, at the computing device, the content access mechanism 202, causing the corresponding application 204 to enter a corresponding content application state, the corresponding content application state based on the search string 212 and the usage data 376. Each search result 220 may further include an application access mechanism 202 having a reference to the corresponding application 204 that is installed on the computing device, the application access mechanism 202 indicating an application performable operation for the corresponding application 204, when executed by the application 204, causing the application 204 to enter a general application state different than the content application state. Each search result 220 may further include an application user selectable link 236 associated with the application access mechanism 202.

In some examples, the method 1200 includes displaying the search results 220 in an order based on a corresponding score associated with each search result 220, wherein each score is based on a relevancy of the search result 220 to the search string and the usage data. The method 1200 further includes displaying the search results 220 in an order based on a relevancy of the corresponding content access mechanism 202 of each search result 220 to the search string and the usage data. In some examples, the method 1200 includes sending, from the computing device to a subscription system in communication with the computing device, a subscription request to one or more of the content feeds 142, each content feed 142 associated with a corresponding content access mechanism 202. Each content feed 142 may be accessible through a corresponding feed access mechanism 202 having a reference to one of the one or more applications 204 installed on the computing device.

Figure 13:
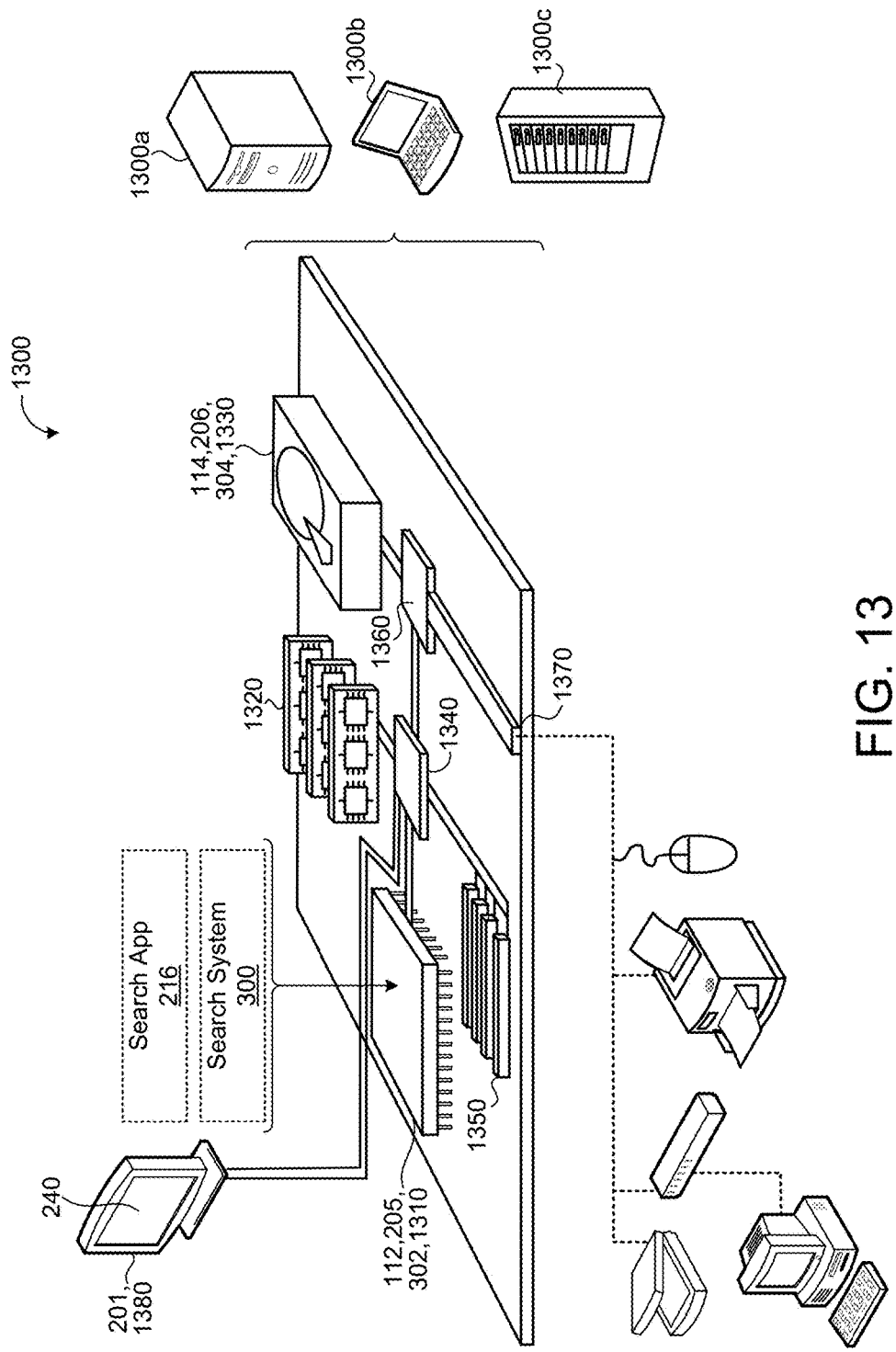
FIG. 13 is a schematic view of an example computing device executing any systems or methods described herein.

FIG. 13 is a schematic view of an example computing device 1300 that may be used to implement the systems and methods described in this document. The computing device 1300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosure described and/or claimed in this document.

The computing device 1300 (e.g., the search application 216, the user device 200 or the search system 300) includes a processor 112, 205, 302, 1310, memory 1320, a storage device 114, 206, 304, 1330, a high-speed interface/controller 1340 connecting to the memory 1320 and high-speed expansion ports 1350, and a low speed interface/controller 1360 connecting to low speed bus 1370 and storage device 1330. Each of the components 1310, 1320, 1330, 1340, 1350, and 1360, are interconnected using various busses, and may be mounted on a common motherboard or in other manners as appropriate. The processor 1310 can process instructions for execution within the computing device 1300, including instructions stored in the memory 1320 or on the storage device 1330 to display graphical information for a graphical user interface (GUI) on an external input/output device, such as display 1380 coupled to high speed interface 1340. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1320 stores information non-transitorily within the computing device 1300. The memory 1320 may be a computer-readable medium, a volatile memory unit(s), or non-volatile memory unit(s). The memory hardware 1320 may be physical devices used to store programs (e.g., sequences of instructions) or data (e.g., program state information) on a temporary or permanent basis for use by the computing device 1300. Examples of non-volatile memory include, but are not limited to, flash memory and read-only memory (ROM)/programmable read-only memory (PROM)/erasable programmable read-only memory (EPROM) electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 1330 is capable of providing mass storage for the computing device 1300. In some implementations, the storage device 1330 is a computer-readable medium. In various different implementations, the storage device 1330 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1320, the storage device 1330, or memory on processor 1310.

The high speed controller 1340 manages bandwidth-intensive operations for the computing device 1300, while the low speed controller 1360 manages lower bandwidth-intensive operations. Such allocation of duties is exemplary only. In some implementations, the high-speed controller 1340 is coupled to the memory 1320, the display 1380 (e.g., through a graphics processor or accelerator), and to the high-speed expansion ports 1350, which may accept various expansion cards (not shown). In some implementations, the low-speed controller 1360 is coupled to the storage device 1330 and low-speed expansion port 1370. The low-speed expansion port 1370, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1300 may be implemented in a number of different forms, as shown in the figure. For example, it may be implemented as a standard server 1300a or multiple times in a group of such servers 1300a, as a laptop computer 1300b, or as part of a rack server system 1300c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor may receive instructions and data from a read only memory or a random access memory or both. The essential elements of a computer are a (processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
    receiving, at a computing device of a search system, usage data of one or more applications installed on a user device, wherein the usage data includes usage data associated with the user device and/or usage data associated with one or more subscriptions and the one or more applications installed on the user device, and wherein the search system is separate from the user device;
    receiving a search query for content from the user device at the computing device;
    identifying, by the computing device, one or more application states of the one or more applications based on the search query and the usage data; and
    generating, by the computing device, search results personalized for a user of the user device, wherein the search results include one or more content access mechanisms of the identified one or more application states, and wherein each of the content access mechanisms has a reference to a corresponding installed application on the user device and indicates a performable operation for the corresponding installed application.

2. The method of claim 1, further comprising generating, at the computing device, a user profile associated with the user device,
    wherein the user profile comprises:
        user profile data comprising device data, wherein the device data defines at least one of a device location, a device operating system, or a list of applications installed on the user device, and wherein the list of applications includes the one or more applications; and
        subscription tags defining one or more user subscriptions to the content access mechanisms.

3. The method of claim 2, further comprising associating a score with each personalized search result based on a relevancy of each of the search results with the search query and the subscription tags of the user profile,
    wherein the relevancy of each of the search results is based on at least one of the subscription tags of the user, an age of the user, a home location, or a user device type.

4. The method of claim 2, wherein each of the subscription tags identifies a corresponding one of the one or more applications installed on the user device and an associated content feed.

5. The method of claim 4, further comprising, for each of the subscription tags:
    determining whether contents of the corresponding one of the subscription tags were previously crawled and have an associated feed record; and
    when the contents of the corresponding one of the subscription tags have not been crawled, crawling the contents of the corresponding one of the subscription tags to generate a feed record.

6. The method of claim 4, wherein each of the content feeds is accessible through a corresponding feed access mechanism having a reference to one of the one or more applications installed on the user device.

7. The method of claim 4, wherein each of the search results comprises:
    one of the content access mechanisms having a reference to a corresponding one of the one or more applications installed on the user device and indicating a content performable operation for the corresponding one of the one or more applications; and
    an application access mechanism having a reference to a corresponding one of the one or more applications installed on the user device and indicating a general performable operation for the corresponding one of the one or more applications, wherein the general performable operation is different than the content performable operation,
    wherein the content access mechanisms are associated with the subscription tags, and wherein the content access mechanisms are different than the application access mechanisms.

8. The method of claim 7, wherein each of the search results further comprises:
- a content user selectable link associated with a corresponding one of the content access mechanisms; and
- an application user selectable link associated with a corresponding one of the application access mechanisms.

9. The method of claim 8, further comprising:
- receiving, from the user device, an indication of one of the content user selectable links or one of the application user selectable links; and
- executing one of the content access mechanisms or one of the application access mechanisms associated with the indication.

10. The method of claim 1, wherein:
- the one or more applications installed on the user device comprise a plurality of applications;
- the one or more application states comprise a plurality of application states;
- the identifying of the one or more application states comprises identifying, based on the search query and the usage data, the plurality of application states respectively for the plurality of applications; and
- the one or more content access mechanisms includes a content access mechanism for each of the plurality of application states.

11. A method comprising:
- sending, from a computing device of a user device to a search system in communication with the computing device, usage data comprising application data indicating one or more applications installed on the computing device and subscription data defining one or more subscriptions to content feeds, wherein each of the subscriptions is associated with one of the one or more applications installed on the computing device, and wherein the search system is separate from the user device;
- sending, from the computing device to the search system, a search query;
- receiving, at the computing device, search results transmitted from the search system, wherein each of the search results includes a content access mechanism, wherein each of the content access mechanisms has a reference to a corresponding one of the one or more applications that is installed on the computing device and associated with the usage data, and wherein each of the content access mechanisms indicates a content performable operation for the corresponding one of the one or more applications based on the usage data; and
- displaying, on a display in communication with the computing device, a graphical user interface including the search results, wherein each of the search results includes a content user selectable link associated with a corresponding one of the content access mechanisms.

12. The method of claim 10, further comprising:
- receiving, at the computing device, an indication to execute one of the content access mechanisms; and
- executing, at the computing device, the one of the content access mechanisms indicated and causing the corresponding one of the one or more applications to enter a corresponding content application state, wherein the corresponding content application state is based on the search query and the usage data.

13. The method of claim 12, wherein:
- each of the search results further comprises an application access mechanism having a reference to the corresponding one of the one or more applications installed on the computing device; and
- each of the application access mechanisms indicates an application performable operation for the corresponding one of the one or more applications when the corresponding application access mechanism is executed by the corresponding one of the one or more applications and causes the corresponding one of the one or more applications to enter a general application state, wherein the general application state is different than the corresponding content application state.

14. The method of claim 13, wherein each of the search results further comprises an application user selectable link associated with the corresponding one of the application access mechanisms.

15. The method of claim 10, further comprising displaying the search results in an order based on a corresponding score associated with each of the search results, wherein each of the scores is based on a relevancy of the corresponding search result to the search query and the usage data.

16. The method of claim 10, further comprising displaying the search results in an order based on a relevancy of the corresponding one of the content access mechanisms of each of the search results to the search query and the usage data.

17. The method of claim 10, further comprising sending, from the computing device to a subscription system in communication with the computing device, a subscription request to one or more of the content feeds,
- wherein each of the content feeds is associated with a corresponding one of the content access mechanisms.

18. The method of claim 10, wherein each of the content feeds is accessible through a corresponding feed access mechanism having a reference to one of the one or more applications installed on the computing device.

19. A user device comprising:
- a display;
- a computing device in communication with the display; and
- a memory in communication with the computing device, wherein the memory is configured to store instructions that when executed on the computing device cause the computing device to perform operations, wherein the operations comprise:
- sending, from the computing device to a search system in communication with the computing device, usage data, wherein the usage data includes application data indicating one or more applications installed on the computing device and subscription data defining one or more subscriptions to content feeds, wherein each of the subscriptions is associated with an application installed on the computing device, and wherein the search system is separate from the user device;
- sending, from the computing device to the search system, a search query;
- receiving, at the computing device, search results transmitted from the search system, wherein each of the search results includes a content access mechanism, wherein each of the content access mechanisms has a reference to a corresponding one of the applications installed on the computing device and associated with the usage data, and wherein each of the content access mechanisms indicates a content performable operation for the corresponding one of the applications based on the usage data; and
- displaying, on the display, a graphical user interface including the search results, wherein each of the search results includes a content user selectable link associated with the corresponding one of the content access mechanisms.

20. The user device of claim 19, wherein the operations performed by the computing device further comprise:
   receiving, at the computing device, an indication to execute one of the content access mechanisms; and
   executing, at the computing device, the one of the content access mechanisms and causing the corresponding one of the one or more applications to enter a corresponding content application state, wherein the corresponding content application state is based on the search query and the usage data.

21. The user device of claim 20, wherein:
   each of the search results further comprises an application access mechanism having a reference to the corresponding one of the one or more applications that is installed on the computing device;
   each of the application access mechanisms indicates an application performable operation;
   each of the application performable operations, when executed by the corresponding one of the one or more applications, causes the corresponding one of the one or more applications to enter a general application state; and
   the general application states are different than the content application states.

22. The user device of claim 21, wherein each of the search results further comprises an application user selectable link associated with the corresponding one of the application access mechanisms.

23. The user device of claim 19, wherein the operations performed by the computing device further comprise displaying the search results in an order based on a corresponding score associated with each of the search results, wherein each of the scores is based on a relevancy of the corresponding one of the search results to the search query and the usage data.

24. The user device of claim 19, wherein the operations performed by the computing device further comprise displaying the search results in an order based on a relevancy of the corresponding one of the content access mechanisms of each of the search results to the search query and the usage data.

25. The user device of claim 19, wherein the operations performed by the computing device further comprise sending, from the computing device to a subscription system in communication with the computing device, a subscription request to one or more of the content feeds, wherein each of the content feeds is associated with a corresponding one of the content access mechanisms.

26. The user device of claim 19, wherein each of the content feeds is accessible through a corresponding feed access mechanism having a reference to one of the one or more applications installed on the computing device.

* * * * *